US009872369B2

(12) United States Patent
Julian et al.

(10) Patent No.: US 9,872,369 B2
(45) Date of Patent: Jan. 16, 2018

(54) LIGHTING CONTROL SYSTEM

(71) Applicants: Danial Julian, Athens, IL (US);
Zhongren Zhang, Springfield, IL (US);
Haogang Chen, Somerville, MA (US);
Richard Mansell, Covington, VA (US)

(72) Inventors: Danial Julian, Athens, IL (US);
Zhongren Zhang, Springfield, IL (US);
Haogang Chen, Somerville, MA (US);
Richard Mansell, Covington, VA (US)

(73) Assignee: XKGLOW INC., Athens, IL (US)

( * ) Notice: Subject to any disclaimer, the term of this patent is extended or adjusted under 35 U.S.C. 154(b) by 0 days.

(21) Appl. No.: 15/170,634

(22) Filed: Jun. 1, 2016

(65) Prior Publication Data
US 2017/0354019 A1 Dec. 7, 2017

(51) Int. Cl.
G06F 3/0482 (2013.01)
G06F 3/0488 (2013.01)
H05B 37/02 (2006.01)
H05B 33/08 (2006.01)
H05B 39/04 (2006.01)
G06F 3/0481 (2013.01)
G06F 3/0484 (2013.01)
G06F 3/0486 (2013.01)
B60Q 1/44 (2006.01)
G01S 19/13 (2010.01)

(52) U.S. Cl.
CPC ........... H05B 37/0272 (2013.01); B60Q 1/44 (2013.01); G01S 19/13 (2013.01); G06F 3/0482 (2013.01); G06F 3/0486 (2013.01); G06F 3/04817 (2013.01); G06F 3/04847 (2013.01); H05B 33/0863 (2013.01); H05B 37/0227 (2013.01); H05B 37/0236 (2013.01); H05B 37/0281 (2013.01); H05B 39/041 (2013.01)

(58) Field of Classification Search
CPC .. G06F 3/0482; G06F 3/04847; G06F 3/0486; G06F 3/0489; G06F 3/167; G06F 8/38; G06F 8/61; G06F 9/00; G06F 9/44; H05B 37/0863; H05B 37/0227; H05B 37/0236; H05B 37/0281; H05B 39/041
USPC ....... 315/312, 291, 307, 297, 294, 250, 318; 715/834, 841, 810, 823, 835, 863, 773
See application file for complete search history.

(56) References Cited

U.S. PATENT DOCUMENTS 5,001,398 A  3/1991  Dunn
6,714,128 B2  3/2004  Abbe et al.
(Continued)

Primary Examiner — Douglas W Owens
Assistant Examiner — Wei Chan

(57) ABSTRACT

A lighting control system of the type including an electronic device with a processor, memory, wireless communication capability and a user interface may be used. A controller may be used with a receiver to receive wireless communication from the electronic device and an output terminal with at least one lighting array in electrical communication with the output terminal of the controller. A power supply may be provided in electrical communication with the controller thereby providing electrical power to the controller and the lighting array. Software on the electrical device may be used providing a graphical interface with a user to actuate the controller to provide an electrical output to the lighting array. The combination may be placed on a building, vehicle or any object to allow a plurality of lighting themes and palettes. Music may also be used to control the lighting output as well as speed or acceleration.

15 Claims, 14 Drawing Sheets

(56) References Cited

U.S. PATENT DOCUMENTS

| | | | |
|---|---|---|---|
| 6,853,887 B1 | 2/2005 | Greenwell | |
| 7,199,705 B1 | 4/2007 | Mixon | |
| 7,332,877 B2 | 2/2008 | Crodian et al. | |
| 7,500,770 B2 | 3/2009 | Medina | |
| 7,561,036 B2 | 7/2009 | Pederson | |
| 7,589,622 B2 | 9/2009 | Farley | |
| 7,646,291 B2 | 1/2010 | Counts | |
| 7,843,333 B2 | 11/2010 | Angelhag et al. | |
| 8,061,879 B2 | 11/2011 | Simmons et al. | |
| 8,466,621 B2 | 6/2013 | Pribula et al. | |
| 8,477,019 B2 | 7/2013 | Laroia et al. | |
| 8,588,997 B2 | 11/2013 | Pribula et al. | |
| 8,730,256 B2 * | 5/2014 | Vinkenvleugel | G06F 3/04847 345/589 |
| 8,963,428 B2 | 2/2015 | Kang et al. | |
| 9,161,420 B2 | 6/2015 | Park | |
| 9,204,521 B2 | 7/2015 | Salomon et al. | |
| 2014/0070706 A1 * | 3/2014 | Fushimi | H05B 33/0863 315/131 |
| 2014/0380234 A1 * | 12/2014 | Shim | G06F 3/0482 715/781 |
| 2016/0179309 A1 * | 6/2016 | Sriganesh | G06F 3/038 715/834 |

* cited by examiner

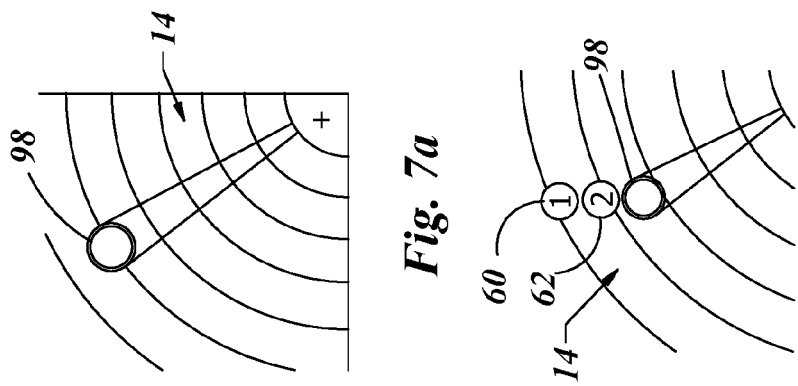
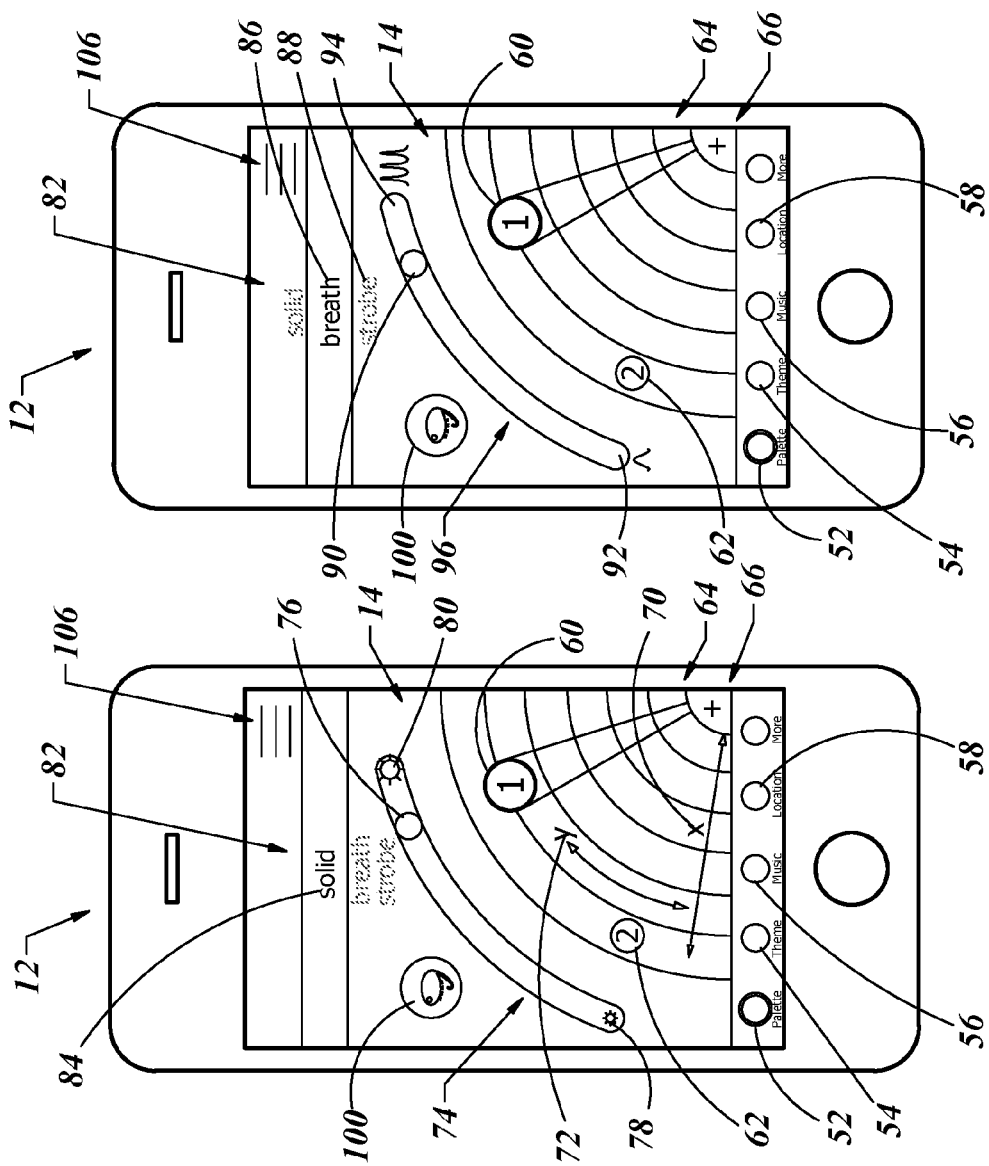

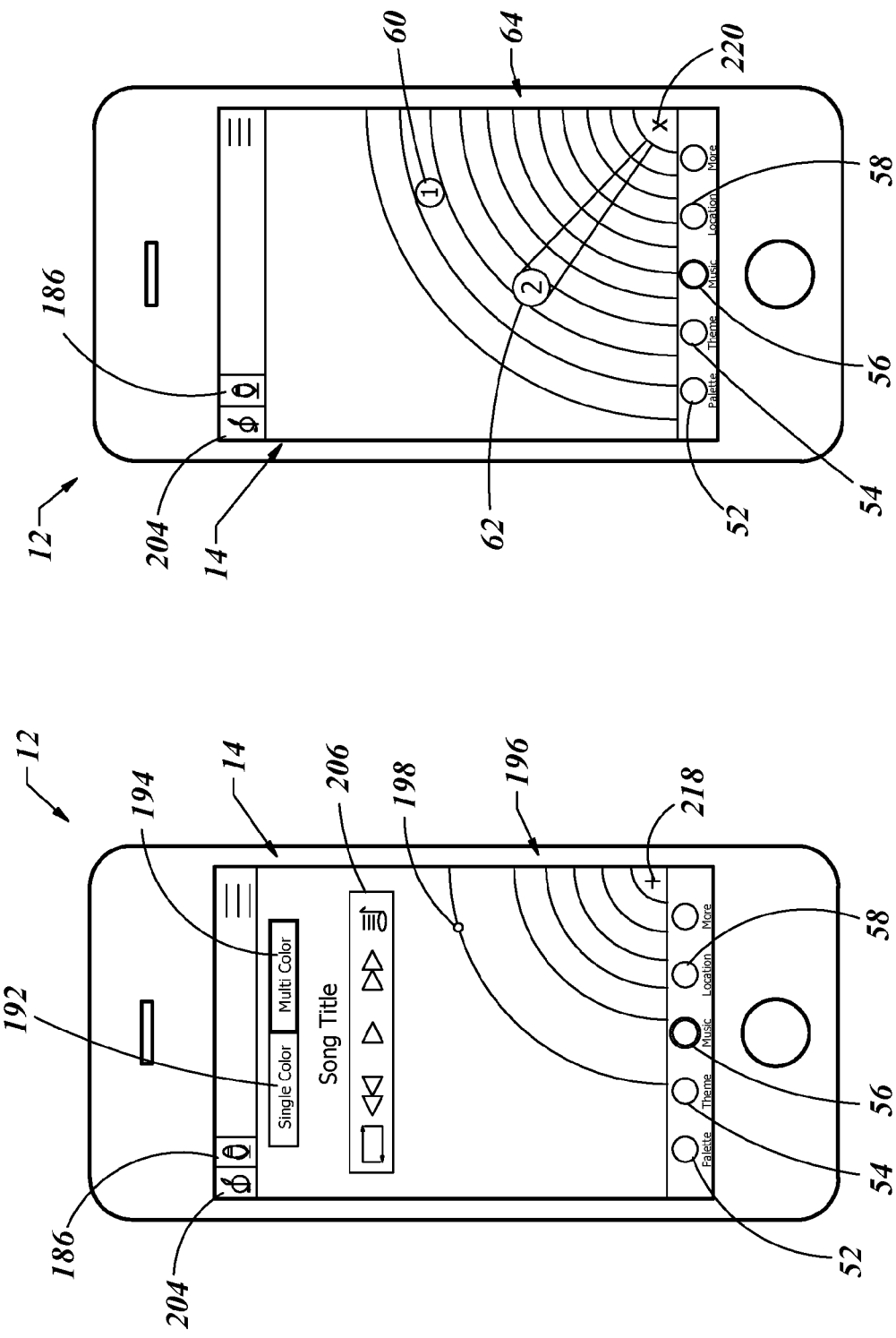

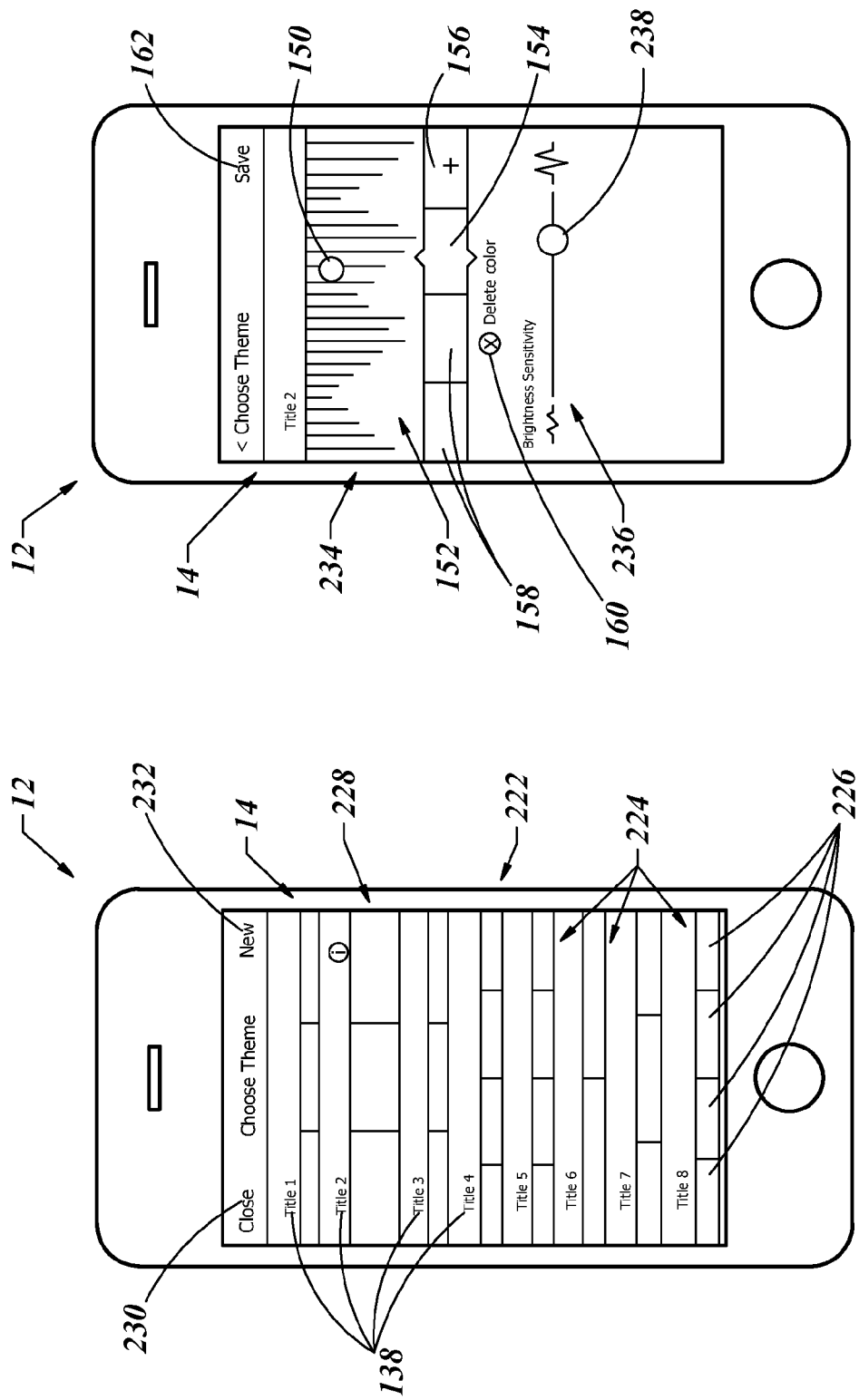

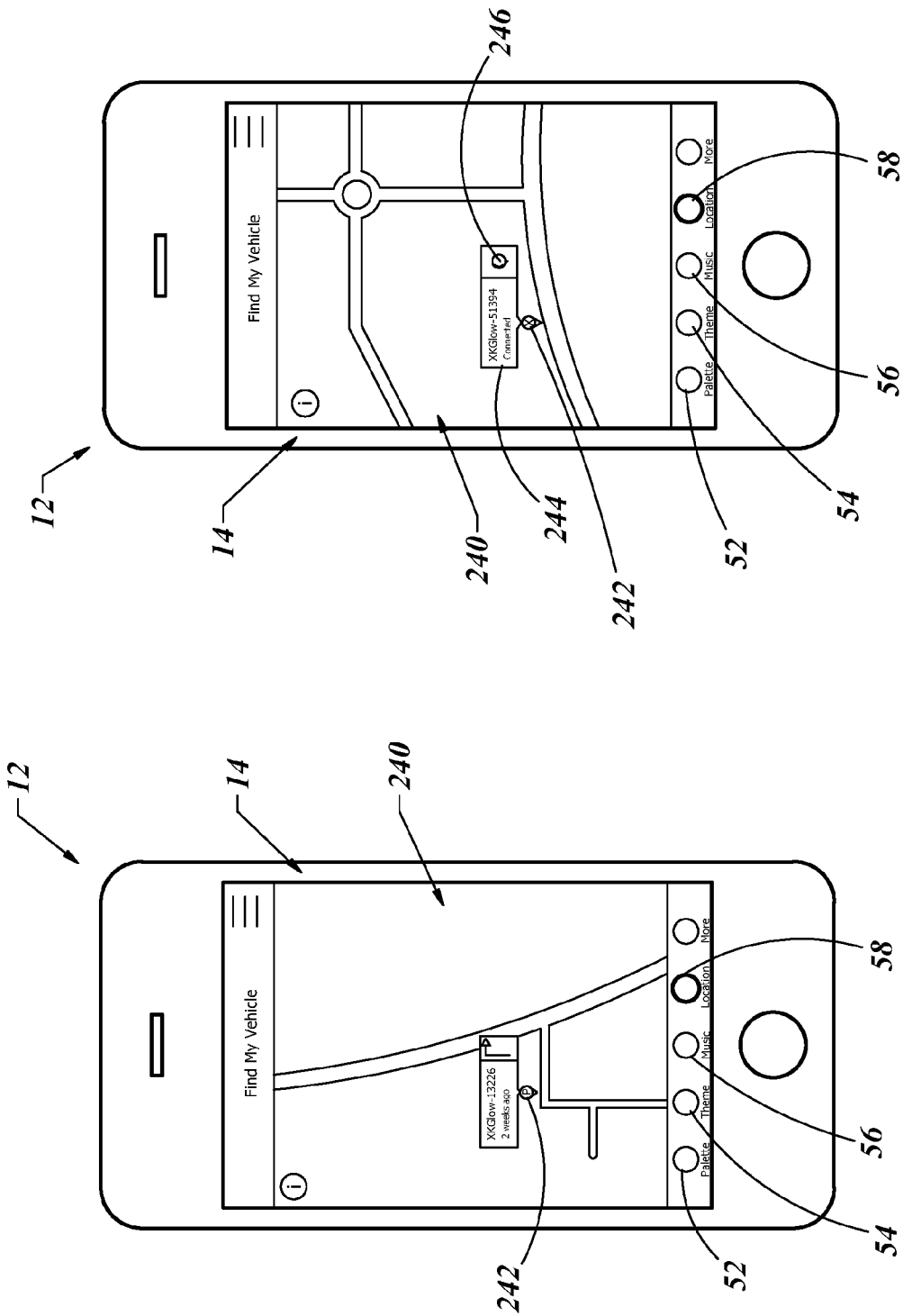

LIGHTING CONTROL SYSTEM

FIELD OF THE INVENTION

The present invention generally relates to lighting control systems and, more particularly, to lighting control systems used in conjunction with a portable electronic device.

BACKGROUND OF THE INVENTION

Lights on vehicles are not only commonly used but a vital safety feature when the vehicle is driven and especially driven at night. Law enforcement officers will not hesitate to stop and ticket a vehicle that does not comply with laws put in place to make the operation of a vehicle safe by enabling the operator to see the road and other vehicles and potential hazards. In addition vehicles have required lights to create better visibility of their vehicle to others. The more clearly a vehicle can be seen, the lower the risk of being accidently hit by another vehicle. Lights that "move" in that the color or color patterns change over time draw attention to the vehicle, further enhancing the vehicle's likelihood of being seen on the road.

People enjoy decorating. Homes, businesses, and objects such as trees around the world are adorned with lighting displays for holidays and sometimes just to create a particular ambiance. Vehicles are also an expression of personality and individuality and as such, can be decorated. Adding lighting to vehicles may help people to bring attention to that vehicle, as with product advertizing on the vehicle, or simply to express team or holiday spirit. If nothing else, it may just be just an artistic expression. Regardless of the motivation, vehicle lighting may have a variety of positive effects for the user. The true value is not just putting some lights on the vehicle but the ability to create an artistic interaction of light that provides increased visibility of the vehicle, thus creating increased safety and an expression of the personality of the user. This may require a more interactive combination of colors and brightness in a dynamic but controlled nature. For this, the ability to create and control this process in a manner that is expansive and user friendly may be needed.

It should, therefore, be appreciated that there is a need for a lighting control system including an electronic application that allows for use on a variety of electronic devices, and may include GPS location and may provide a functional user interface to control one or more lighting systems. The present invention fulfills this need and others.

SUMMARY OF THE INVENTION

The present invention may include a lighting control system of the type including an electronic device with a processor, memory, wireless communication capability and a user interface. A controller may be included with a receiver to receive wireless communication from the electronic device and an output terminal. The system may further include at least one lighting array in electrical communication with the output terminal of the controller. A power supply may be included in electrical communication with the controller, thereby providing electrical power to the controller and the lighting array. Software may be included on the electrical device, the software providing a graphical interface with a user to actuate the controller to provide an electrical output to the lighting array. The software may include setting a color palette by using the graphical interface and the steps of setting a color by manipulating an icon about a partial circle area with a center point of the circle located near a corner of the graphical interface. The color hue may be adjusted by movement of the icon in one radial dimension and moving the same icon in an orthogonal radial dimension to alter the saturation of that color. Setting a brightness value of the color may be accomplished by moving an icon on a sliding scale on the graphical interface, the sliding scale having a similar center point as the partial circle. The system may also include an auto shutdown switch that may signal the controller to turn off the lighting array after a set amount of time after the controller looses the wireless communication with the electronic device.

The center point of the partial circle may be located near the lower right corner of the graphical interface of the electronic device. By doing so, a user may grasp the electronic device in their right hand and interact with the graphical interface of the electronic device using the right thumb of the user. The lighting control system may also include providing a screen flip function. Actuation of the screen flip function to a first setting may provide the center point of the circle area to be located near the bottom right corner of the graphical interface and in a second setting the center point of the circle area may be located near the bottom left corner of the graphical interface.

The invention may also include a pattern selection option on the graphical interface of the electronic device. The pattern selection may be a pattern selected from the group consisting of a solid pattern, a slow fade pattern and a strobe pattern. A solid pattern may be a color that comes on and stays on. A slow fade pattern may be a pattern that starts out as a low intensity (lower light) and slowly increases to a brighter light. A strobe may be a light that goes from an off position to an on position rapidly and then rapidly to an off position again, repeating on a systematic basis.

More than one output terminal may be used, each output terminal and any lighting array in electrical communication with that output terminal may be designated by a separate zone with respect to a different output terminal. One zone may be grouped together with another zone to form a group, thereby any action taken to affect the group will affect both zones. A zone may be grouped to another zone by dragging the icon of one zone over to and stopping over an icon of another zone. Two concentric circles may be displayed without any numbers in the circles to designate that icon represents more than one zone that are now grouped together to act as one zone.

The system may include a color selection icon on the graphical interface, the use of the graphical interface may include the steps of activating the camera function of the electronic device, creating a source image and saving it within the memory of the electronic device. A color mapping system may be used on a finite number of pixels of the source image. The system may elect a color within the memory of the electronic device with similar color properties to the source image. The system may further include the step of enhancing the color of the source image by use of a color purifying algorithm, which may be used to maximize the level of saturation of the color. This may be done prior to selecting a mapped color from the memory of the electronic device.

The palette of the lighting control system may also include a white light setting. The white light color may be defined as a temperature range of burning carbon as measured in degrees Kelvin. This temperature may be selected for one or more zones. An additional step of adding any color to a favorites category may be done. Any color currently being used may be added to a favorites palette that may be later retrieved by the user by actuation of a single button.

The controller may further include a sensor wire for receiving a voltage input to the controller from a source outside of the lighting control system. Upon receiving the voltage input by way of the sensor wire, the controller may provide an electrical output to the lighting array. This output may be fully customized to display color, pattern, and speed of one or more zones.

The lighting system may also include the ability to select and use a color theme. Selection of a color theme may include the steps of selecting a lighting pattern, selecting a pattern frequency, colors and selecting a lighting brightness. The lighting system may also include a set up for setting a specific theme as a startup theme for one or more zones. A sensor wire may also be used similar to that as previously disclosed.

The lighting system may also have software which includes the ability to set a music link. The music link may use the graphical interface and the steps of selecting a music source input, selecting the lighting color mode and selecting the color of one or more zones, wherein the lighting output may be mapped to the volume changing scope of the music. The music source input may be an input selected from the group consisting of music stored on the electronic device and ambient music received by a microphone on the electronic device. The music received by the microphone may be adjusted in sensitivity by adjusting a volume filter by way of a graphic slider on the graphical interface of the electronic device.

The music link may also include single color mode and a multi color mode, wherein the single color mode results in a lighting output of the lighting array that is of a single color and varies in brightness according to the volume changing scope of the music. The multi color mode results in a lighting output of the lighting array that includes more than one color and varies in brightness according to the volume changing scope of the music.

The electronic device of the lighting system may include a GPS beacon and GPS software and the software may include displaying GPS data on the graphical interface. The controller may include a receiver adapted to receive short distance wireless communication, such as a short-wavelength, ultra high frequency radio wave communication, from the electronic device. The use of the system may include the steps of establishing a short distance wireless communication between the electronic device and the controller, moving the electronic device out of range of the controller and thereby breaking the short distance communication between the electronic device and the controller, and activating the GPS beacon in the electronic device and sending GPS coordinate information to the graphical interface at the moment the short distance communication between the electronic device and the controller is broken. The system may also include the steps of moving the electronic device near the controller so as to reestablish short distance communication between the electronic device and the controller, pressing the light icon on the map on the graphical interface, and activating the lighting array of the lighting system, thereby alerting the user as to the exact location of the lighting control system and any vehicle to which the lighting system is attached.

The lighting control system may further including the steps of collecting two GPS locations, calculating the distance between the two GPS locations, divided the distance by the time over which that distance was traveled, thereby providing a speed of movement of the electronic device and graphically displaying the speed of movement on the electronic device. The higher the speed the device reads the brighter the light output may be, within the adjusted range. You may adjust the speed range by pulling the speedometer right/up and left/down. Speed value may also change the color. The speed of movement may be graphically displayed as a quarter circle analog dial with a needle indicator displaying the current speed. The quarter circle analog dial may include an adjustable scale that can be changed by the user by touching the scale area and dragging that touched area toward a minimum scale value to increase a maximum scale value. The electronic device may also include an accelerometer and the acceleration of the electronic device may be displayed as a quarter circle analog dial with a needle indicator displaying the current acceleration. The greater the acceleration force the device reads the brighter the light output may be. The acceleration value may also change the color. This scale may also be adjustable in a similar manner as noted above for the current speed.

For purposes of summarizing the invention and the advantages achieved over the prior art, certain advantages of the invention have been described herein above. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which:

FIG. 5 is a plan view of an electronic device as shown in FIG. 1 providing a graphic interface with the user and a setup of a color palette for a solid form of continuous color output for the application software of the system as shown in FIG. 1.

FIG. 6 is a plan view of an electronic device as shown in FIG. 1 providing a graphic interface with the user and a setup of a color palette for a breath form of varying color output for the application software of the system as shown in FIG. 1.

FIG. 7a is a plan view of a close up of the lower right portion of the display of the electronic device of FIG. 6 in which more than one zone has been grouped together and a color chosen.

FIG. 7b is a plan view of a close up of the lower right portion of the display of the electronic device of FIG. 7a in which zones 1 and 2 are still grouped together but displayed to allow them to be ungrouped.

FIG. 20 is a plan view of the electronic device of FIG. 1 providing a graphic interface for the user to control the lighting output based on the music playing on the electronic device and used for a multi color output.

FIG. 21 is a plan view of the electronic device of FIG. 1 providing a graphic interface for the user to adjust the grouping and colors of each group of the lighting output based on the music playing on the electronic device.

FIG. 22 is a plan view of the electronic device of FIG. 1 providing a graphic interface for the user to select a color group for the lighting output based on the music playing on the electronic device.

FIG. 23 is a plan view of the electronic device of FIG. 1 providing a graphic interface for the user to edit a color group for the lighting output based on the music playing on the electronic device.

FIG. 24 is a plan view of the electronic device of FIG. 1 providing a graphic interface for the user to utilize the find my vehicle function on the electronic device.

FIG. 25 is a plan view of the electronic device of FIG. 1 providing a graphic interface for the user with the find my vehicle function on the electronic device and actuating the lights of the vehicle.

DETAILED DESCRIPTION OF THE INVENTION

Figure 1:
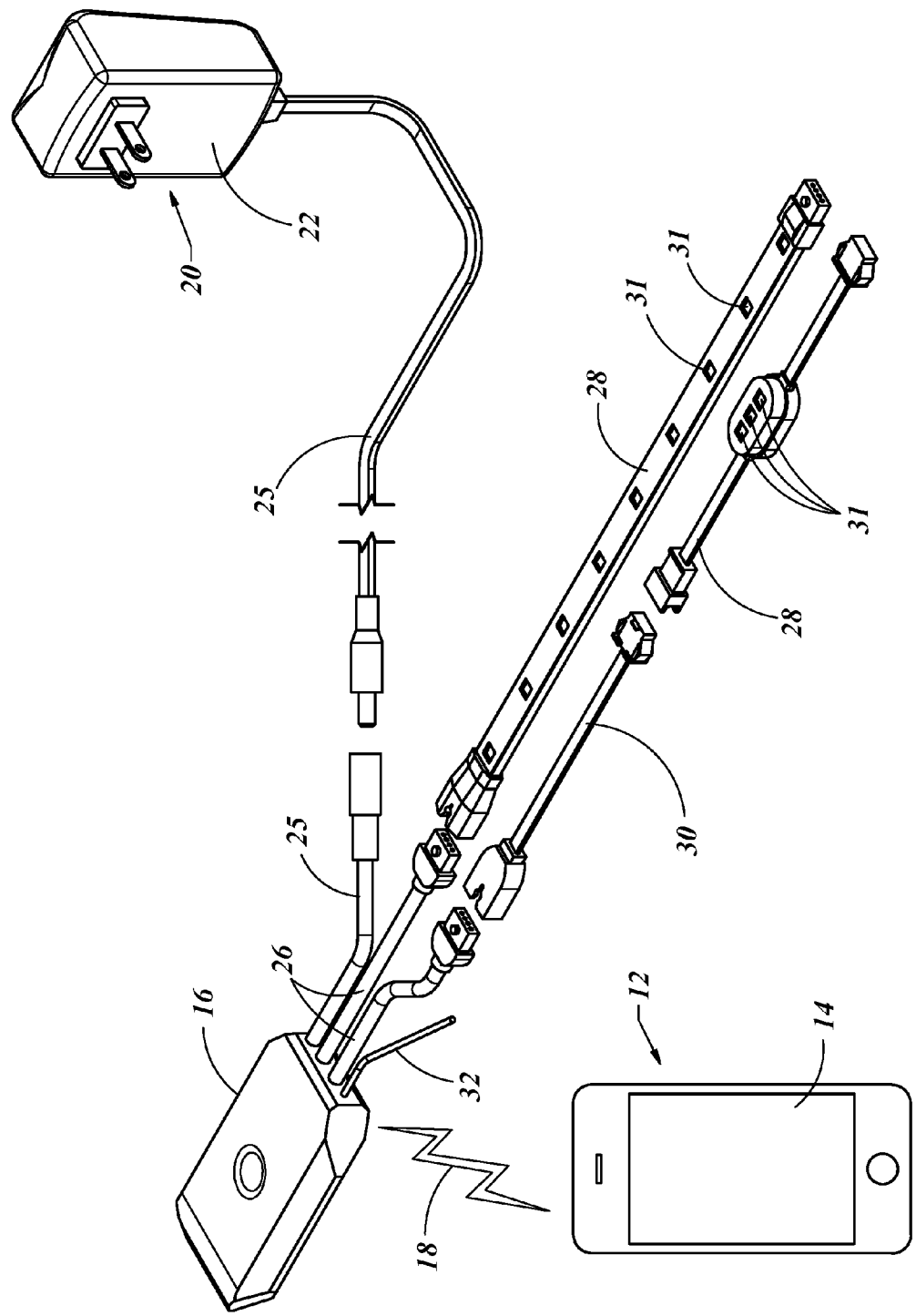
FIG. 1 is an isometric view of a disassembled lighting control system with an electronic device, presented in accordance with the present invention.
Figure 2:
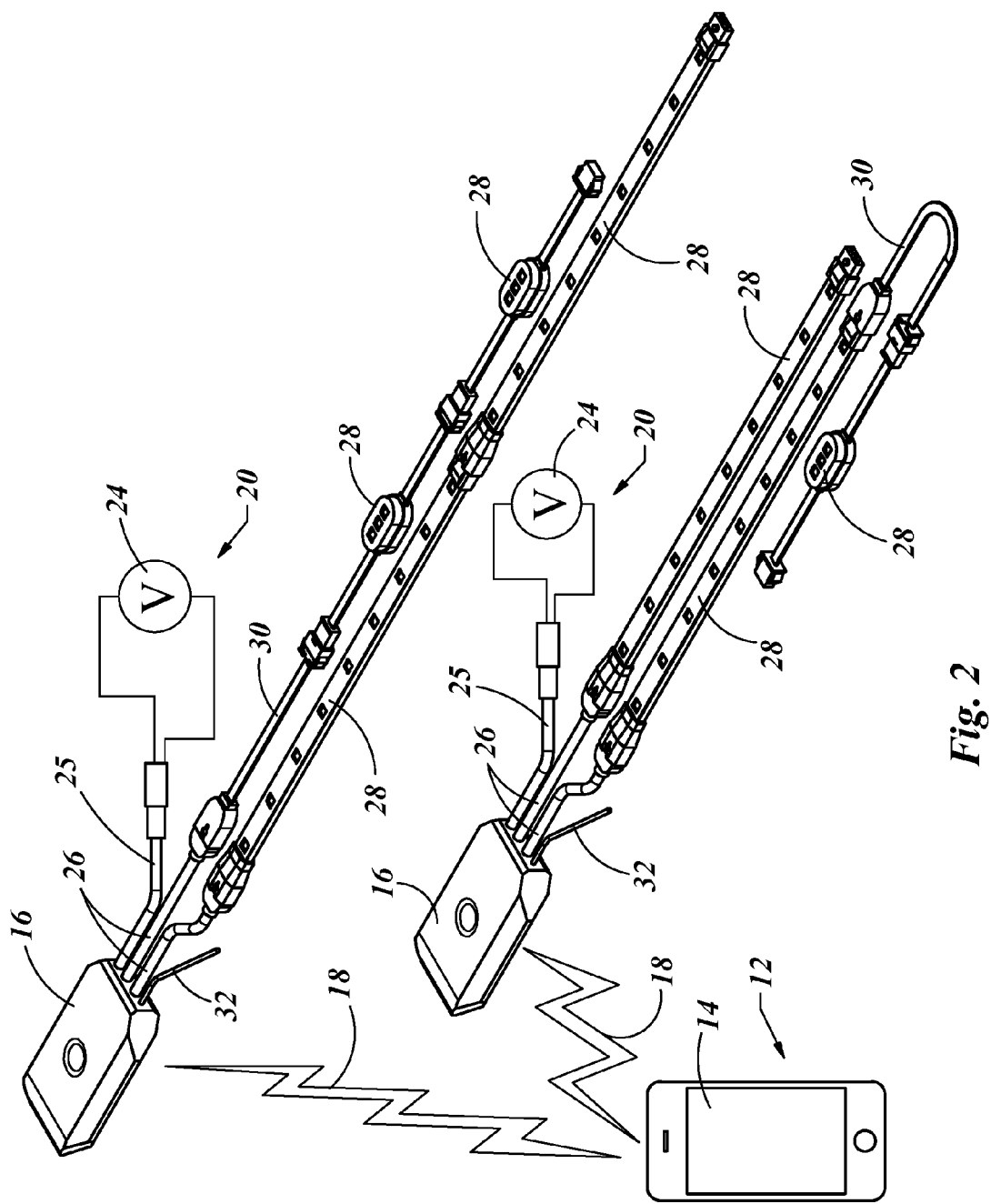
FIG. 2 is an isometric view of a single electronic device and two lighting systems, presented in accordance with the present invention.
Figure 3:
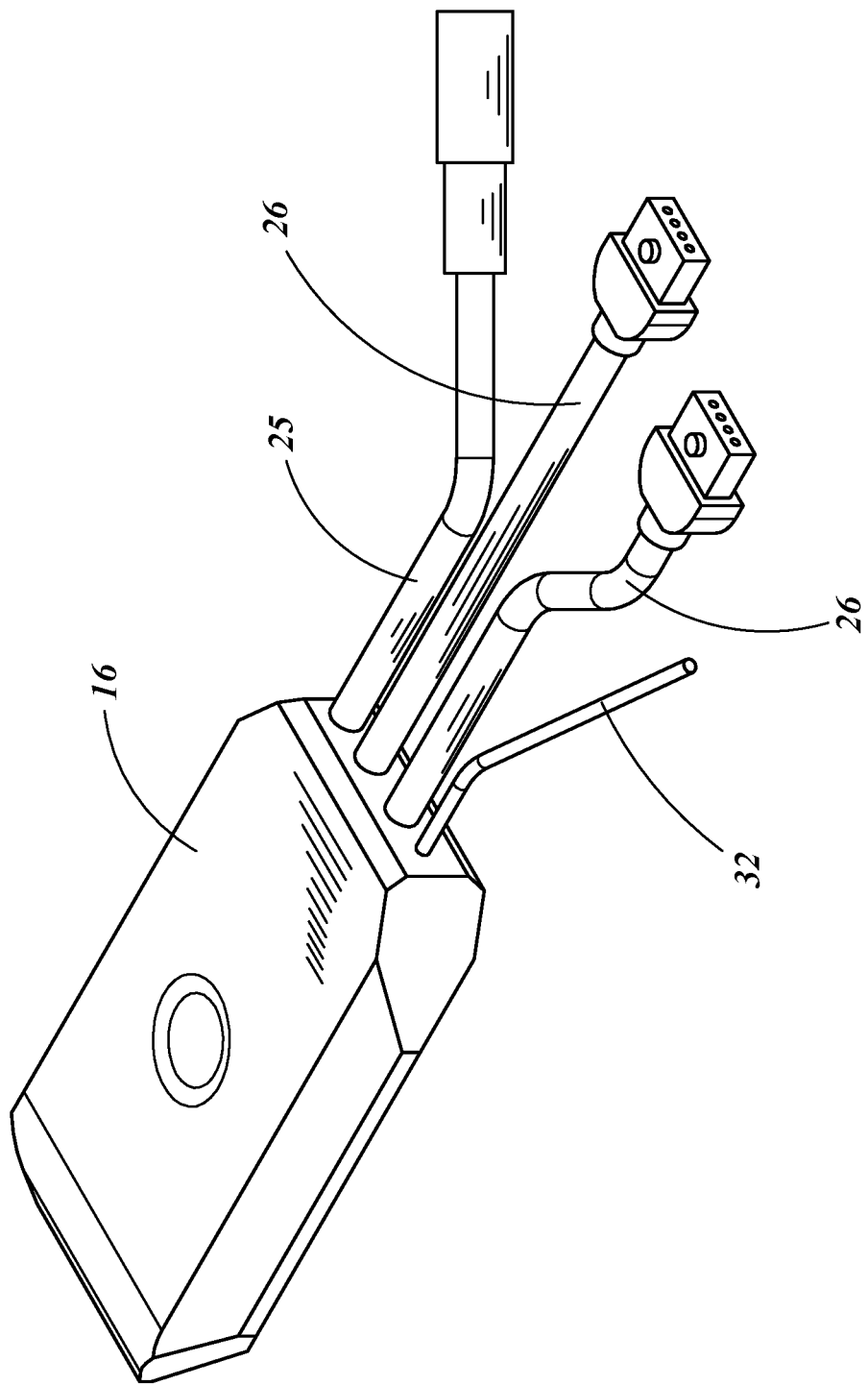
FIG. 3 is an isometric view of a controller as shown in FIG. 1.

With reference to the illustrative drawings, and particularly to FIGS. 1-3, there is shown an electronic device 12 in the form of a "smart phone" or "gadget". The electronic device 12 may include a user interface such as a display 14 or graphical interface. As with this type of electronic device 12, the graphical interface 14 may be interactive in that it may be touch screen capable so that the graphical interface 14 may not only function to provide "read only" data to the user, but enable data input through touching marked areas of the graphical interface 14. The device 12 may also include an iPad, iPhone, Android, or any other handheld computer that includes a processor, memory, wireless communication capability and a user interface, namely a graphical interface 14, and preferably a touchscreen display. In this disclosure the term "icon" may refer to a graphical symbol that may be displayed on the graphical interface 14. As noted, the graphical interface 14 may be a touch screen display, and therefore enable the area of the graphical interface 14 which displays the icon, to cause some action when touched. Therefore, in this disclosure, the icon may act similar to a button, that when depressed, causes some action.

A controller 16 may include a receiver adapted to receive wireless communication 18 from the electronic device 12. The controller 16 may be provided electrical power from a power supply 20 which may include an AC outlet 22 or voltage supply 24 of the type that may be provided from an automotive vehicle. The power supply 20 may provide electrical communication with the controller 16 by way of the power cable 25. The controller 16 may receive the wireless communication 18 from the electronic device 12 in the form of short wavelength, ultra-high-frequency radio waves. Though technology is constantly changing, currently the range of such a system is approximately 10 meters. As is shown in FIG. 2, more than one controller 16 may be controlled with a single electronic device 12. Each controller 16 may be recognized by the electronic device 12 with a different frequency, thereby distinguishing one controller 16 from another controller 16. The controller 16 may convert a digital signal generated by the electronic device 12, which may be sent by wireless communication 18 to the controller 16, into a voltage output signal to one or more output terminals 26. One or more lighting arrays 28 may be electrically coupled to an output terminal 26. A variety of different lighting arrays 28 may be used in combination with one of the output terminals 26 of the controller 16. The lighting arrays 28 may be coupled directly to the output terminal 26, or by way of a lighting extension 30. A single lighting array 28 may be coupled to an output terminal 26 or multiple lighting arrays 28 may be coupled to each other in series and then coupled to an output terminal 26.

The lighting arrays 28 may be comprised of one or more light sources 31 alone or grouped together. The light sources 31 may be any type of lighting system. For the purposes of illustration the light sources 31 used in this disclosure will be light emitting diodes (LED's) and preferably multicolor light emitting diodes. It is not the intent of the applicants to limit the scope of the disclosure to any particular type of light sources 31. Incandescent lights could also be used or any lighting technology not yet currently known. To change the brightness on incandescent light the voltage to the light is altered, higher voltage is brighter light and lower voltage is lower light. With a light emitting diode (LED) the pulse width of the voltage signal is increased for greater brightness and decreased for a lesser brightness. This process is commonly called pulse width modulation (PWM). To change the color emitted by a multicolor light emitting diode the pulse width of each of the red, blue and green (RBG) diodes within the light source 31 may be individually modulated to produce any number of color outputs in accordance with that level of mixture of red, blue and green light.

Two or more output terminals 26 may be provided with each controller 16. Each output terminal 26 of each controller 16 may provide a unique zone, such that each output terminal 26 may operate independently from the other output terminal 26 or be grouped together to operate as a single output terminal 26. The grouping process of this will be discussed in greater detail later in this disclosure.

A sensor wire 32 may also be provided with each controller 16. The sensor wire 32 may provide an additional electrical input signal to the controller 16. An example of such an electrical input through the sensor wire 32 may be provided from the wiring to the brake lights, turn signals or other wiring providing a signal. Therefore, if the sensor wire 32 is wired in parallel with the wiring to the brake lights, when the brakes of the vehicle are pressed by a driver, and the brake lights are activated and an electrical signal is sent to the controller 16 by way of the sensor wire 32. This may produce an alternative signal to one or more of the lighting arrays 28 by way of one or more of the output terminals 26. As an example, when the brakes of the vehicle are activated, the light output through an output terminal 26 may be changed from what it was prior to brakes of the vehicle being activated. This may include turning the light output from all the lighting arrays 28 connected to each of the output terminals 26 bright red when the brakes are actuated, in essence turning the entire vehicle into giant set of brake lights. This may be valuable to alert other vehicles to the change in speed of the vehicle which includes the lighting arrays 28. This may provide a clear safety feature, especially for smaller vehicles such as motorcycles, which may already be harder to see because of their smaller physical size, especially at night.

Figure 4:
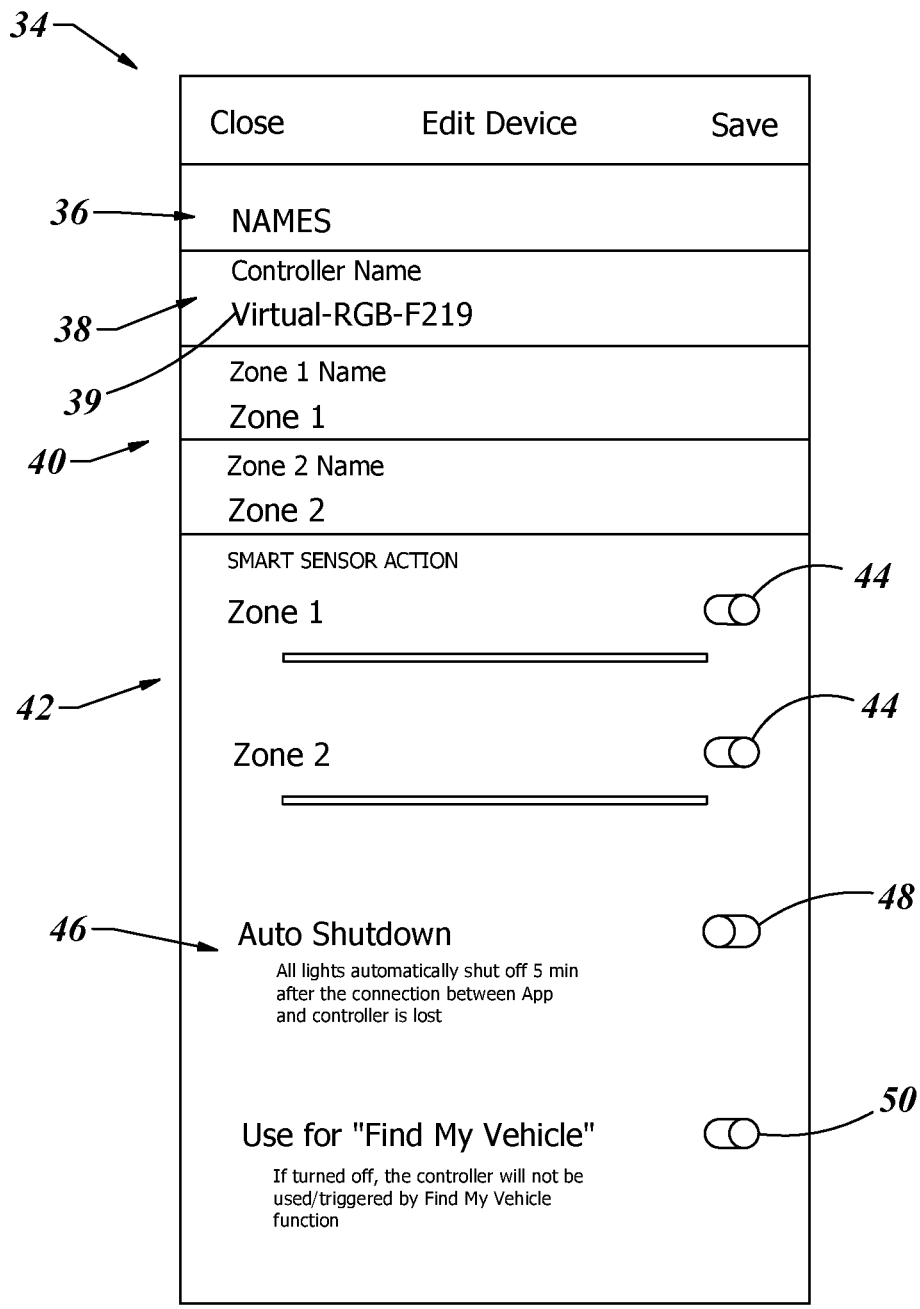
FIG. 4 is a setup screen for an electronic device as shown in FIG. 1.

With attention to the software of the invention that may be loaded onto the electronic device 12, examples of the graphic interface and systems are shown in FIGS. 4-27. With reference to FIG. 4, an example of a set up screen 34 is shown. This may include a list of some of the general functions of each controller 16 that is in communication with the electronic device 12. The identification section 36 may include the ability to name a specific controller 16. In that one electronic device 12 may interact with multiple controllers 16, it may be advantageous to create a name for a particular controller 16. For example, if used with a vehicle, one controller 16 may control a series of lighting arrays 28 near the front of the vehicle. In this case, the name may be chosen to be, for example, "FRONT" thus identifying that series of lighting arrays 28 in a manner that is easily recognizable by the user.

The controller name 38 may be listed with a factory identification number 39. This may be beneficial in the event of a failure or damage to the controller 16. In that case, the factory identification number 39 may be used for warranty or identification purposes.

As noted, in the examples of each controller 16 shown in the drawings there are two output terminals 26. It has been noted that there may be more than two output terminals 26, or possibly a single output terminal 26. With that said, the disclosure will focus on the invention having two output terminals 26, each output terminal 26 being identified by a zone specified in the software. Just as the controller 16 may be named, so may each zone be given a specific name. The zone name section 40 may be provided to the user as shown in FIG. 4. Each zone may also be equipped with the ability to toggle on and off a smart sensor action feature 42. The smart sensor action feature 42 has been described earlier in use with the sensor wire 32. As such, the sensor wire 32 may be in electrical communication with any one source. In this disclosure only one sensor wire 32 is shown but there could be more than one, each could be connected to a different source, such as one to the brake lights an done to the turn signals.

There are two zones shown in the smart sensor action 42. Each zone may be connected to a different lighting array 28. Each zone may be toggled on or off with a zone switch 44 so that only the zone(s) that are turned on will be activated when the controller 16 receives an electrical input by way of the sensor wire 32.

Another option on the set up screen 34 may be an auto shutdown 46. The auto shutdown 46 may also include a shutdown switch 48. When the shutdown switch 48 is on, this may enable the controller 16 to automatically shut down all lighting arrays 28 after a predetermined amount of time, such as five minutes, after the electronic device 12 is out of range and breaks the wireless communication 18 between the electronic device 12 and the controller 16. The purpose may be to extend the battery life of a vehicle from which the controller 16 and lighting arrays 28 are receiving their electrical power. If the vehicle is unattended, it may be desirable to have the lighting arrays 28 not be active and also not draw unwanted attention to the vehicle.

A feature which enables a user to find their vehicle may be turned on or off by use of a vehicle finder switch 50. The details of the find my vehicle function are shown in FIGS. 24-25 and will be discussed in detail later in the disclosure. The vehicle finder switch 50 enables that feature to be turned on so that the feature is activated, or turned off to be inactive. If a user does not intend on using this feature and misplaces their electronic device 12, a stranger could go to the feature and locate the user's vehicle without the vehicle owner's knowledge. This feature may be turned off, thus disabling the feature, by setting the vehicle finder switch 50 to the off position.

One embodiment of the software loaded on the electronic device 12 and presented on the graphical interface 14, which may be used to give instructions to the controller 16 is shown in FIGS. 5-27. The software may include four categories and displayed by icons including: palette 52, theme 54, music 56 and location 58. These icons may be positioned near the bottom of the graphical interface 14 of the electronic device 12 as shown in FIGS. 5-6. With a touchscreen display as a graphical interface 14, each one of these categories may be selected by touching that icon associated with that category.

As is shown in FIG. 5, the palette category 52 has been selected. The palette 52 may define the color of the lighting arrays 28 for that zone. A feature of the software displayed on the graphical interface 14 may include a first zone icon 60 and a second zone icon 62. When a zone icon (60 or 62) is touched on graphical interface 14, that zone icon may increase in size and be highlighted as the first zone icon 60 is in FIG. 5. The highlighted first zone icon 60 may then be dragged by maintaining contact with a finger of the user and moving it on the graphical interface 12. In this embodiment, a partial circle area 64 may be positioned on the graphical interface 14 with the geographical center 66 located near the lower right corner of the graphical interface 14. An advantage to such a graphical layout is that a person could have the device in the palm of their right hand and interact with the icons on the graphical interface 14 using only the thumb of that hand. This may make the interaction with the electronic device 12 a process that requires using only one hand.

In the partial circle area 64, a portion of the graphical interface 14 may include a color wheel 68. The color wheel 68 may also be shaped as a partial circle as here it is shown to be a quarter circle. By dragging the first zone icon 60 closer or farther from the geographical center 66, thus altering the "x" dimension 70, this may change the color saturation that will be assigned to that first zone icon 60 and therefore the lighting arrays 28 associated with zone one. In the context of this disclosure, the color hue may be defined as the gradation or variety of a color. The property of light by which the color of an object is classified as red, blue, green or yellow in reference to the color spectrum.

By dragging the first zone icon 60 in an angular direction, or orthogonal radial dimension, noted in FIG. 5 as the "y" dimension 72, the color hue may be altered. In the context of this disclosure, the color saturation may be defined as the colorfulness of a color relative to its own brightness, or the intensity of color of an image. Therefore, by dragging the first zone icon 60 to a position within the partial circle area 64 the color and properties of that color may be adjusted. The user may move the first zone icon 60 in the desired position and that color and color properties will then be linked to that zone. The first zone icon 60 may be larger in size as shown here relative to the second zone icon 62, thus communicating to the user that the first zone icon 60 is active and the second zone icon 62 is not active.

Also shown in FIG. 5 a brightness scale 74 may be provided. Here the brightness scale 74 may also be positioned in an arcuate portion of the graphical interface 14 with the center of that arc consistent with the geographical center 66. This may be done for the reasons as previously noted, to allow for a use with a single hand. To adjust the brightness, a brightness slider 76 may be displayed between the minimum brightness area 78 and the maximum brightness area 80. As before, the user's finger or thumb may contact the brightness slider 76 and drag it to any position between the minimum brightness area 78 and the maximum brightness area 80, thereby setting the brightness of either zone that is currently in an adjustment mode. In this figure that would be zone one as the first zone icon 60 is shown to be in a state of being modified.

The lighting pattern may also be adjusted for each zone. This may be accomplished by scrolling through pattern selection function 82. As is shown in FIG. 5, a solid pattern 84 has been selected. A solid pattern 84 may mean that the light emitted from the lighting arrays 28 may be turned on and kept on without being dimmed or turned off and back on again in a defined pattern. As such, there may be no change in frequency because there may be no alteration in the duration of the light fading between an "on" and "off" state. In contrast, as is shown in FIG. 6, a breath pattern 86 may be selected in the pattern selection function 82. A third option is shown to be a strobe pattern 88. Both the breath pattern 86 and the strobe pattern 88 may include a sequence of repeated increasing the brightness and decreasing the brightness in a synchronous pattern. The breath pattern 86 may be a more a fluid transition between greater brightness and lesser brightness and then back to greater brightness. The strobe pattern 88 may be more abrupt in the transition between greater brightness, lesser brightness and then back to greater brightness. With the breath pattern 86 and the strobe pattern 88 the frequency at which the rate of transition between greater brightness to lesser brightness and back to greater brightness occurs may be altered by adjusting the frequency slider 90 between a minimum frequency area 92 and a maximum frequency area 94 of the frequency slider 96. This adjustment process may be similar to the adjustment of the brightness slider 76 as shown in FIG. 5.

In the event that a user desires to make any adjustments and have it apply to both zone one and zone two, this may be done by grouping the zones together. To group any number of zones together the user may drag any zone icon over a second zone icon and hold the icons on top of one another for a short period of time. The result may be a zone icon without a number displayed and appears as a double circle icon 98, as is shown in FIG. 7a. To ungroup any number of zones, the user may touch the double circle icon 98 and hold that position for a brief period time. The number of zones may be displayed, as in FIG. 7b with the first zone icon 60 and the second zone icon 62 graphically displayed above the double circle icon 98 on the graphical interface 14. If the user wishes to ungrouped any zone he may move his finger from the double circle icon 98 and within a short period of time touch the icon relating to the zone they wish to remove from the group and drag it away from the double circle icon 98. If the user does not contact a zone icon and drag it away from the double circle icon 98 within a predetermined amount of time, all of the zones which are grouped within the double circle icon 98 may remain as one group and illustrated by the double circle icon 98. If this happens the image on the graphical interface 14 will return to that as shown in FIG. 7a.

Figure 8:
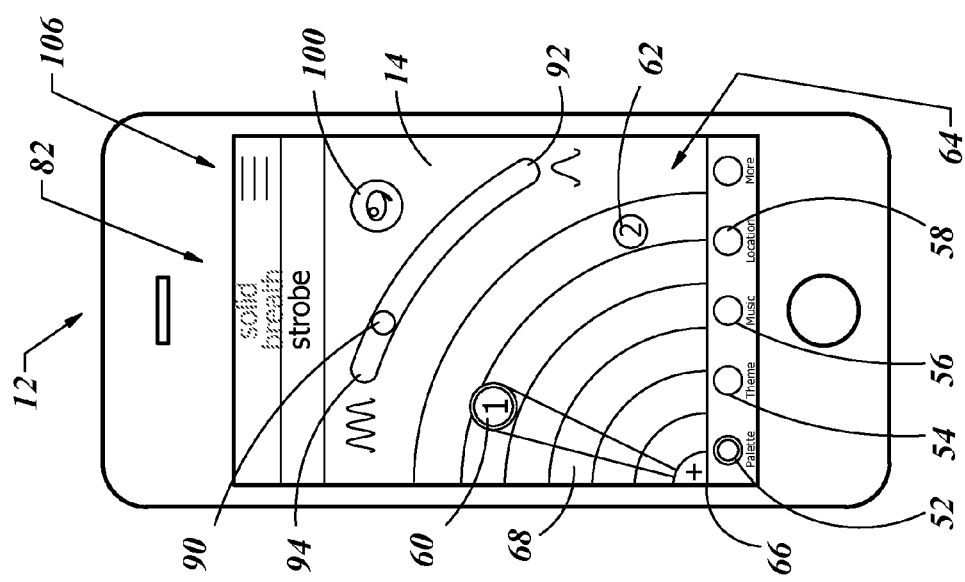
FIG. 8 is a plan view of an electronic device as shown in FIG. 6 with the graphics flipped from a right hand use to a left hand use.

It was previously discussed the graphical interface 14 on the electronic device 12 may include a partial circle area 64 with the geographical center 66 located near a bottom lower corner of the graphical interface 14. In that most people are right-handed, this geographical center 66 has been shown to be located near the lower right portion of the graphical interface 14. The lighting control system as shown and described may also include a screen flip function. The screen flip function may provide the user the ability to mirror the image by moving the geographical center 66 from a lower right corner to a lower left corner. An example of this is shown in FIG. 8. All other details on the graphical interface 14 may be consistent regardless of the relative location of the geographical center 66, be that at the lower right corner suitable for right-handed people (FIG. 6) or in the lower left corner suitable for left-handed people (FIG. 8).

Figure 9:
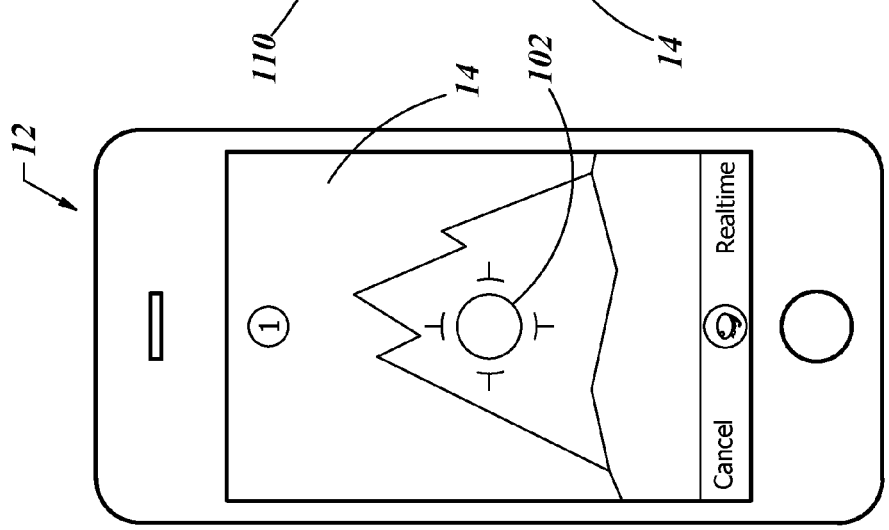
FIG. 9 is a plan view of an electronic device as shown in FIG. 1 providing a graphic interface with the user and a color capture feature is shown using the camera of the electronic device.

Another feature of the lighting control system may be a color selection icon 100. When a user touches the color selection icon 100 a camera function of the electronic device 12 may be activated. The camera function of the electronic device 12 may allow the user the ability to take a digital image of any object. An example of the screen of the electronic device 12 in the camera mode is shown in FIG. 9. The center target 102 on the graphical interface 14 of the electronic device 12 may provide source image that may be analyzed. The target pixels of the digital photographic source image may be saved within the memory of the electronic device 12. The source image may be color mapped to the color palette stored within the software of the electronic device 12. The color mapping process may find a color with similar hue and saturation properties of the source image relative to the color palette. A color purifying algorithm may be used to enhance the color of the source image to maximize the level of saturation of the color prior to selecting a mapped color in the memory of the software in the electronic device 12.

Figure 10:
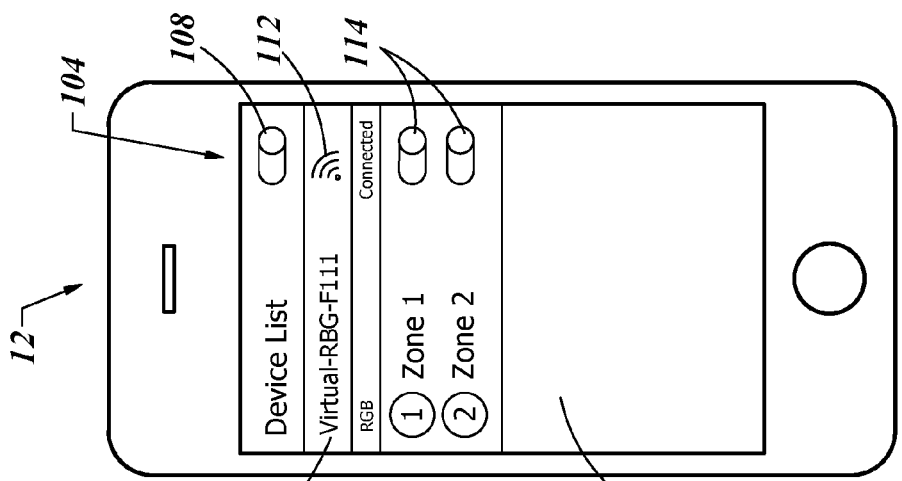
FIG. 10 is a plan view of the electronic device of FIG. 1 providing a graphic interface with the user and a device list screen shot.

With reference to FIG. 10, a device list page 104 may be displayed on the graphical interface 14 of electronic device 12 at any time by pressing the device icon 106. The device list page 104 may include a master switch 108 that may be used to turn on or off the lighting control system. In addition, a controller identification 110 may be provided to identify which controller 16 or controllers 16 are present and which ones are connected to the electronic device 12 with the connection icon 112. The connection icon 112 may display a scaled representation of the signal strength of the wireless communication with that controller 16. Also, each zone may include a power switch 114 which may be used to selectively turn on or off each zone, thereby enabling only the lighting arrays 28 which correspond to the zone or zones which the user would like to illuminate.

Figure 13:
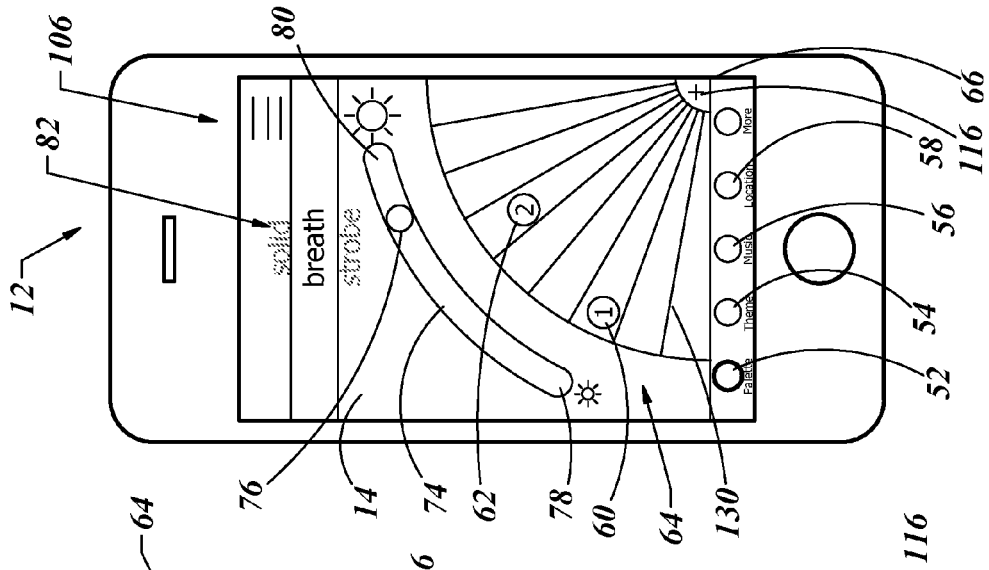
FIG. 13 is a plan view of the electronic device of FIG. 1 providing a graphic interface displaying an example of the white color function of FIG. 11 on the electronic device.
Figure 11:
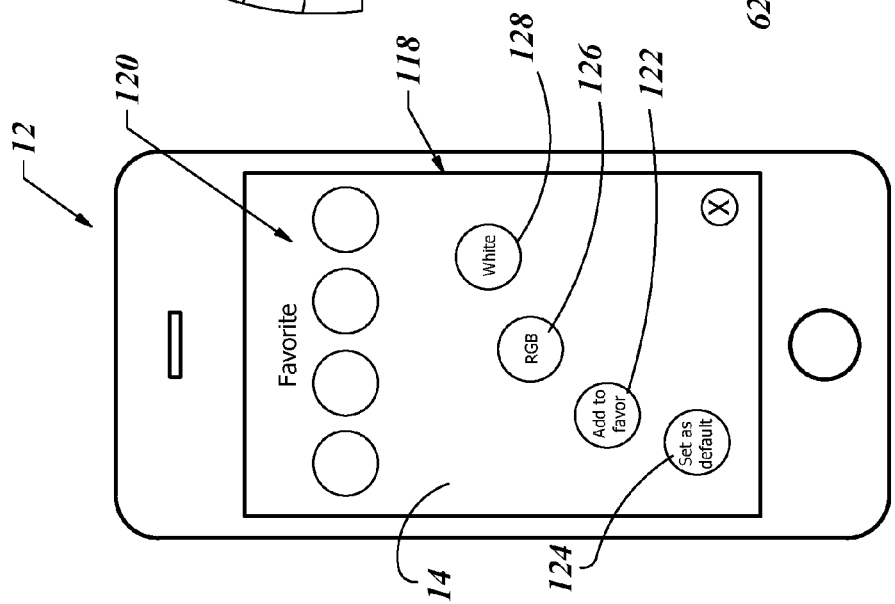
FIG. 11 is a plan view of the electronic device of FIG. 1 providing a graphic interface with the user and a color theme setup.
Figure 15:
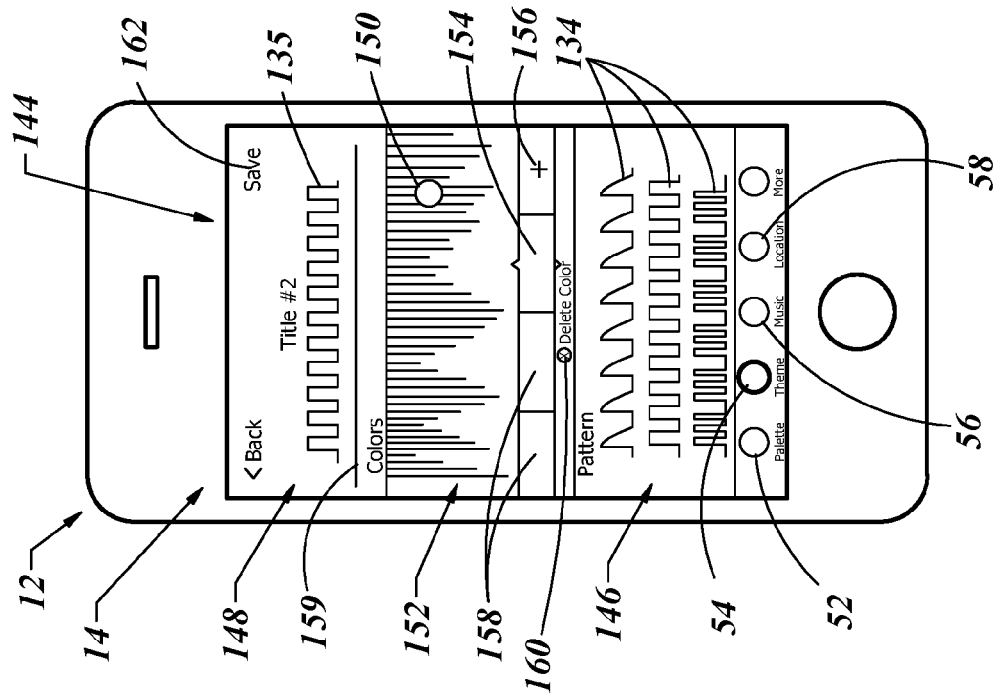
FIG. 15 is a plan view of the electronic device of FIG. 1 providing a graphic interface with the user as a setup for a new color theme.

With reference to FIGS. 11-13 an interface on the graphical interface 14 of the electronic device 12 is shown which may allow a user to set favorites, group zones and use a varied white light output of the lighting arrays 28. If the plus symbol 116, which may be located in the partial circle area 64, is pressed on the graphical interface 14, a favorites page 118 may be displayed, as shown in FIG. 11. A series of stored color icons 120 may be displayed, which may be selected with a single touch. Though only four stored color icons 120 are shown, there may be more color icons 120 that may be accessed by scrolling this area of the graphical interface 14 to the right or left. This may allow additional stored color icons 120 to translate across the graphical interface 14, still showing a set number of stored color icons 120 at any one time. This may allow the size of the stored color icons 120 to be large enough so that the user may accurately select a desired color and yet allow for a multitude of stored colors to be available to the user.

A new color may be created, identified and displayed as a stored color icon 120 and added to the stored color icon list be taking any color currently selected and selecting an add to favorites icon 122. That color may be desired to be used as a starting color in the future, so the user may select a set default icon 124. This may select that color as a color for the lighting arrays 28 in all new zones that are created. This color may be changed by the steps as previously shown and described.

The color palettes that have been depicted thus far, as in FIGS. 5, 6 and 8 may display a multicolored selection based on the red, green and blue (RBG) color spectrum. This may be chosen in selecting the RBG icon 126. White light typically exists between a daylight blue-white and a warm yellow-white and is identified as a temperature on the Kelvin scale. This temperature is based on black body radiation emission. A temperature of 4600K or greater gives a daylight color or a blue-white color of white. A slightly lower temperature of between 3000K and 4600K gives off a cool white color of white. To achieve a warmer color or yellowish white, a lower temperature of below 3000K is required.

Figure 12A:
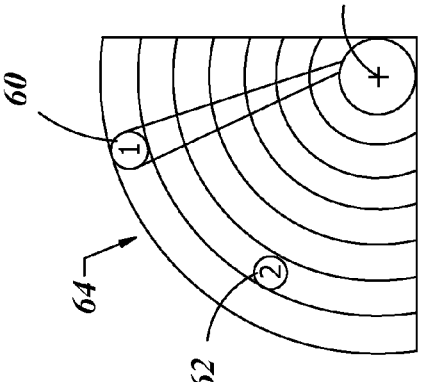
FIG. 12a is a plan view of a close up of the lower right portion of the display of the electronic device of FIG. 11 after selecting the White button in FIG. 11.
Figure 12B:
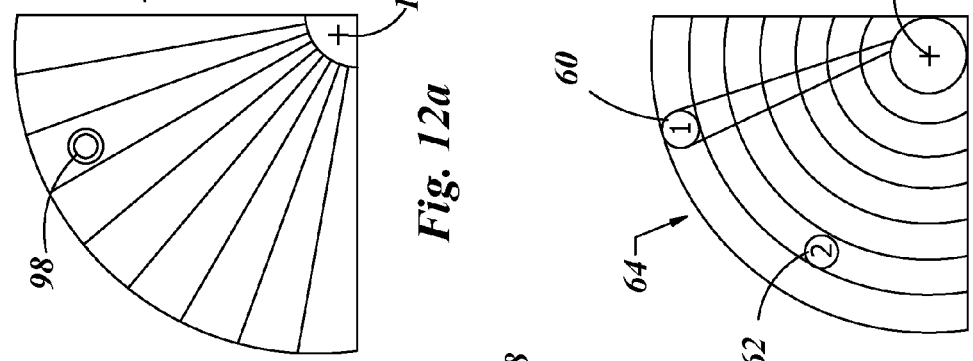
FIG. 12b is a plan view of a close up of the lower right portion of the display of the electronic device of FIG. 11 after selecting the RGB button in FIG. 11.

The lighting control system as presented may offer a varied white light option for color outputs to the lighting arrays 28 by selecting the white icon 128. Selecting the white icon 128 may load on the graphical interface 14 a detail as shown in FIG. 13. Here the first zone icon 60 and the second zone icon 62 may be shown as ungrouped as they are each separately shown. The process as previously discussed of dragging a zone icon (60 or 62) and hovering that zone icon over another zone icon until they are shown as a double circle icon 98 will group the zones together as one, as shown in FIG. 12*a*. This may mean any action made to one zone icon will be applied to all zones in that group. In comparison, the color (RBG) version of the partial circle area 64 with two zones may be illustrated in FIG. 12*b*.

To change the color of white the user may touch and drag the first zone icon 60 or the second zone icon 62 in FIG. 13 (or grouped double circle icon 98 if grouped) and drag that icon more toward the lower left for a higher temperature color, to the upper right for a lower temperature color white or anywhere in between. When the icon is released by the user, this will set the color for that zone. Whether the higher temperature is on the left or right, is not considered relevant, as that portion of the partial circle area 64 may include a background color that is associated with that color, both in the white light and the RBG colors. The radial lines 130 may graphically illustrate that with the white color, only the angular position may alter the color, not the distance of the zone icon (60 or 62) from the geographical center point 66. Therefore in contrast to the RBG (FIG. 5 and FIG. 6) there is no need to change two variables (hue and saturation) only the single variable of the temperature.

The brightness may also be altered. For that the process may be the same as that of changing the brightness of the solid color in the RBG. Here as shown in FIG. 13, to adjust the brightness, the brightness slider 76 may be displayed between the minimum brightness area 78 and the maximum brightness area 80. As before, the user's finger or thumb may contact the brightness slider 76 and dragging it to any position between the minimum brightness area 78 and the maximum brightness area 80.

Figure 14:
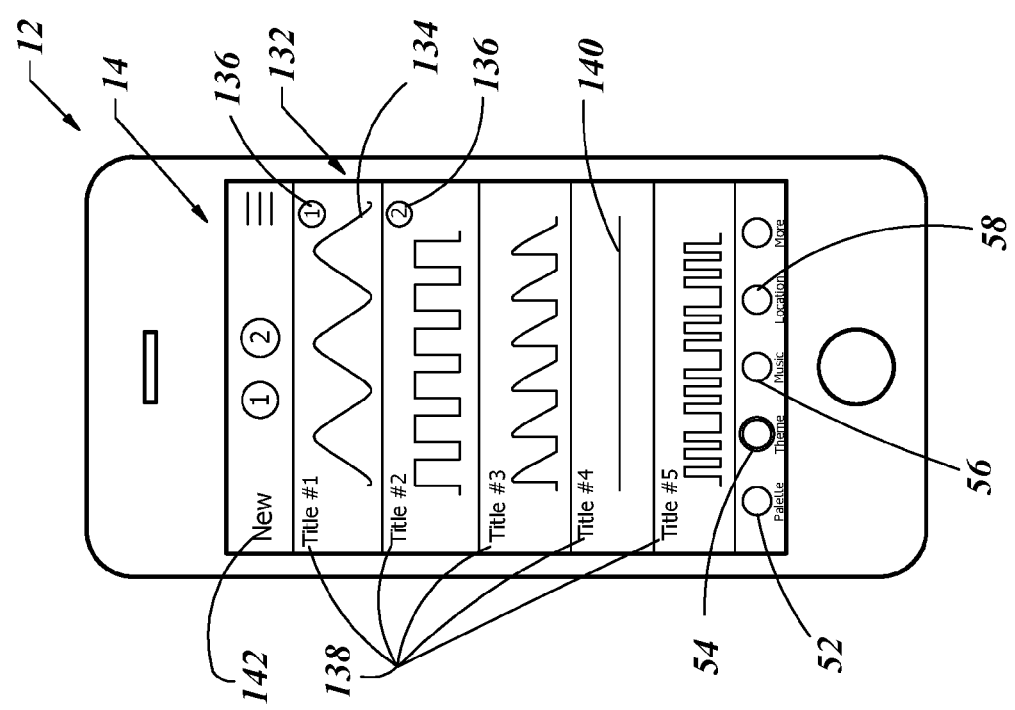
FIG. 14 is a plan view of the electronic device of FIG. 1 providing a graphic interface with the user and an existing color theme or an option to create a new theme.

An example of the user interface associated with the theme category is shown in FIGS. 14-17. A theme may be accessed by pressing the theme category icon 54. A theme may be a combination of changes in light and brightness provided in a repeated pattern. As an example, a Christmas theme may include red and green colors, one color increasing brightness and then dropping off to switch to the other color, then the process repeats in increasing followed by fading brightness. In FIG. 14 a sample of a variety of themes is shown. These are only a few examples as it is understood that there are an infinite number of possible combinations of varying brightness and colors that may exist. The graphical interface 14 of the electronic device 12 may include a set of theme examples 132. Each theme example 132 may include a theme pattern 134 that may represent the changing brightness of the lighting arrays 28 associated with that zone. A zone indicator 136 may show which theme is to be used for that zone. Each theme example 132 may include a title block 138 that may be pre-set or customized by the user to set a certain mood or holiday that is easily recognizable by the user.

The theme pattern 134 may be looked at as a coordinate graph with time along the horizontal axis and brightness along the vertical axis. As the graph line progresses vertically higher as the time passes along the horizontal, the brightness of the light output increases. As the theme pattern 134 decreases, the brightness of light output from the lighting arrays decreases. A horizontal line 140 would mean the brightness is constant. The color change may be graphically presented as background behind the theme pattern 134. The color may be a constant, or it may vary in some set pattern not associated with the theme pattern 134, or it may change in some coordinated manner with the theme pattern 134.

There are a limited number of theme examples 132 that are shown in FIG. 14, and likewise a limited number that would be reasonable to display on any size graphical interface 14. As such, more themes may be displayed by scrolling the list of theme examples 132 upward or downward, still showing a set number on the graphical interface 14 at any given time.

If a new theme is desired to be created by the user, the new icon 142 may be used. By touching the new icon 142 the software may present a theme construction page 144 on the graphical interface 14 of the electronic device 12. An example of this is presented in FIG. 15. To build a theme, a user may select one of any number of given theme patterns 134 from the pattern section 146. Picking a selected theme pattern 135 may then be displayed in a theme pattern display 148. This may allow the user to see what selected theme pattern 135 has been chosen for this theme. A color may be chosen by selecting and moving a color icon 150 to a position in the color area 152. The color identified by the color icon 150 may be displayed in the current color box 154 below the color area 152. To add the color highlighted by the color icon 150, and shown in the current color box 154, the user may select the plus box 156. That color may then be added to the color boxes 158 and color timeline 159 in the order in which they are added. If a color is desired to be removed, the user may touch the color box 158 displaying that color, at which time that color box may be displayed as the new current color box 154. The delete color icon 160 may be selected and that color box may be removed. The removal of that color may also be updated in the color timeline 159. When a theme is completed, the save icon 162 may be pressed.

Figure 16:
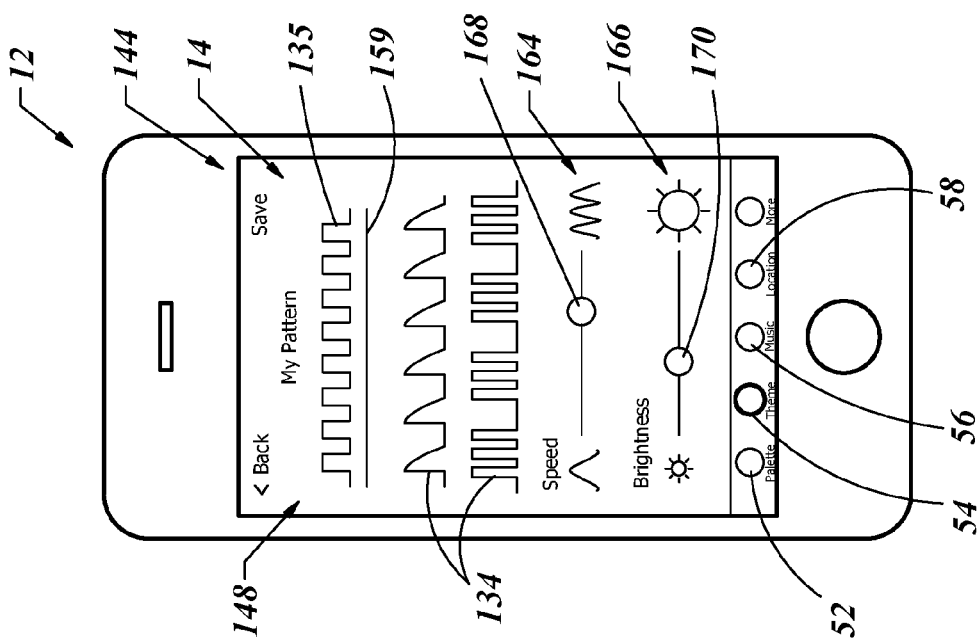
FIG. 16 is a plan view of the electronic device of FIG. 1 providing a graphic interface with the user as a continuation of the setup for a new color theme as shown in FIG. 13.
Figure 19:
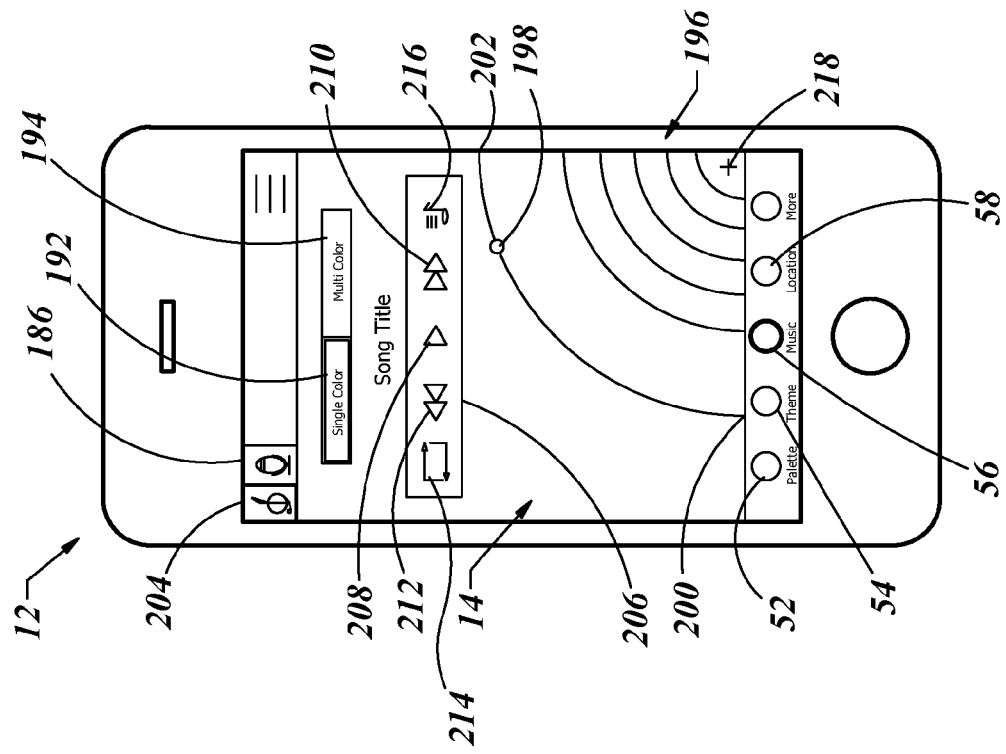
FIG. 19 is a plan view of the electronic device of FIG. 1 providing a graphic interface with the user to synchronize and adjust a lighting output to music or other audio data stored on the electronic device and used with a single color output.

The theme may also be changed as to the frequency and brightness of the color. By scrolling down on theme construction page 144 the speed setting 164 and brightness setting 166 may be presented on the graphical interface 14 of the electronic device 12 as is shown in FIG. 16. The theme pattern display 148 section of the graphical interface 14 of the electronic device 12 may remain visible so that the scrolling area may be below the theme pattern display 148. This may allow the user to continue to see the selected theme pattern 135 and color timeline 159 while being able to view other theme patterns 134 and options such as the speed setting 164 and brightness setting 166. The speed or frequency of the repeating format of the pattern may be increased by touching and dragging the speed slider 168 to the right for a higher frequency and to the left for a lower frequency. The brightness setting 166 may be changed by touching and dragging the brightness slider 170 to the right for a greater brightness or to the left for a lower brightness.

Figure 17:
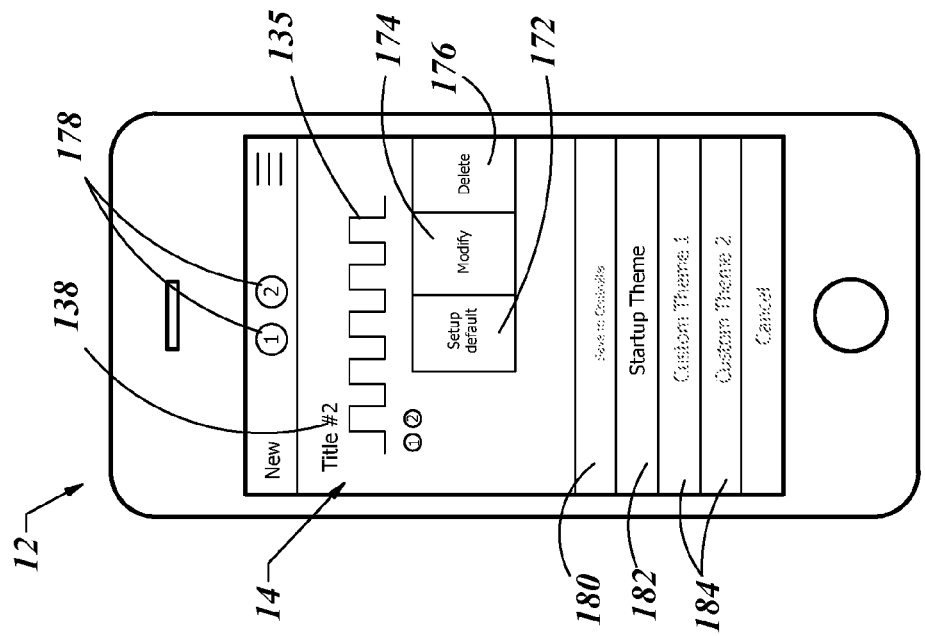
FIG. 17 is a plan view of the electronic device of FIG. 1 providing a graphic interface with the user and the ability to apply a theme to one or more currently assigned zones.

If the user desires to apply a theme to zones in the future, the user may set this theme as a start-up theme. One example of the interaction on the graphical interface 14 of the electronic device 12 is shown in FIG. 17. From the previous screen shown in FIG. 16, a particular theme pattern may be swiped to the left. This may alter that portion of the graphical interface 14 to show three new icons, the setup default icon 172, a modify icon 174 and a delete icon 176.

With a theme chosen, the setup default icon 172 may be selected, which may set this theme as the default theme when creating a new theme or setting up a new zone. The modify icon 174 may allow the user to change any aspect of a theme, such as the color, brightness, frequency or theme pattern. The delete icon 176 may remove that theme from the memory of the electronic device 12. In this mode, the title block 138 may identify the theme to the user and the zone indicators 178 may show which zones this theme is being applied. The theme may then be saved to the controller by way of the save to controller icon 180. As FIG. 17 is showing what may be the startup theme, the startup theme icon 182 may be highlighted. This theme may be saved as other custom themes by selecting one of the custom theme icons 184.

Figure 18:
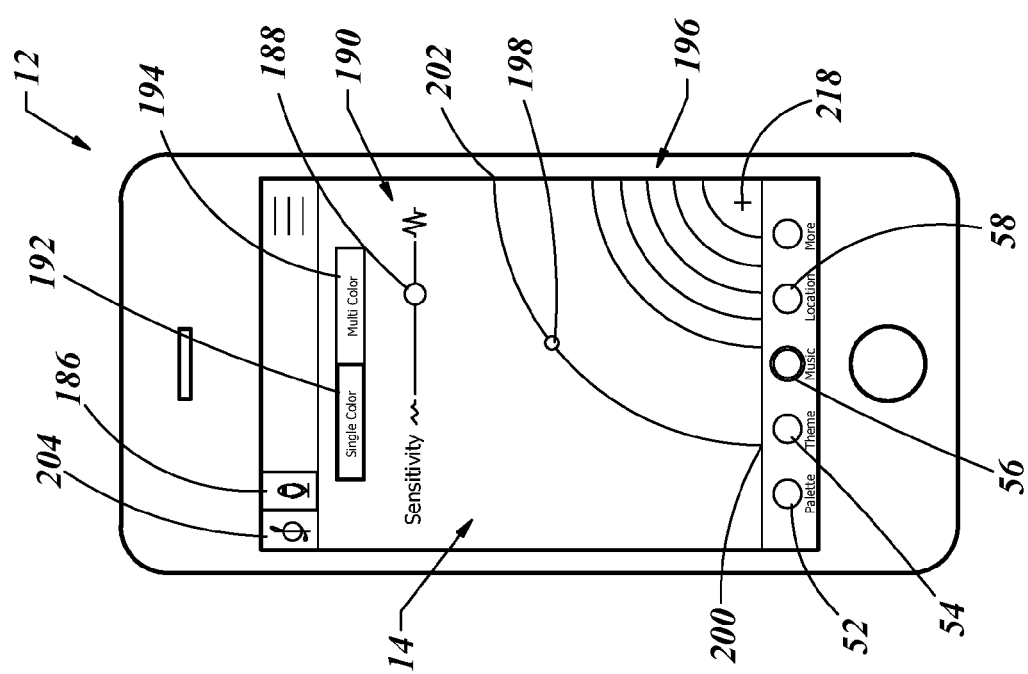
FIG. 18 is a plan view of the electronic device of FIG. 1 providing a graphic interface with the user to synchronize and adjust a lighting output to ambient noise such as music.

It may be desirable to sequence the light output from the lighting arrays 28 to music. This may be accomplished by use of the lighting control system. The process of selecting music and linking it to a color output through the lighting arrays 28 may be illustrated in FIGS. 18-23. The music may be stored and played from the memory in the electronic device 12 or picked up by way of a microphone within the electronic device 12. The light output through the lighting arrays 28 may be a single color or multi colored. An example of the use of the lighting control system to provide light to the lighting arrays 28 from ambient music is shown in FIG. 18. The microphone icon 186 may be activated to signal the software on the electronic device 12 to source music through the microphone on the electronic device 12. The sensitivity of the microphone may be set by adjusting the sensitivity slider 188 on the sensitivity scale 190. The sensitivity scale 190 may be used depending on the volume of the music the user is listening to. For example, if the environment has more than one audio source present, the user may adjust the sensitivity scale 190 down to omit any background noise that may interfere with the desired music.

The graphical interface 14 may include a single color option icon 192 and a multi color option icon 194. The single color option icon 192 may allow for the brightness of the color output through the lighting arrays 28 to be increased in accordance with the relative volume of the music at any time. In contrast, by selecting the multi color option icon 194 the color output at the lighting arrays 28 may be changed as the relative volume of the music changes. The software of the lighting control system may measure the change in volume within an audio range of the music, be that through the microphone as ambient noise or from the music played by the electronic device 12. A light output simulation area 196 may display an example of the light output that may be seen at the lighting arrays 28 at the same time. A music position indicator 198 may graphically display the current position of the song between the starting point 200 and the song end position 202.

To use a song that is saved in the memory of the electronic device 12, the song icon 204 may be selected. An example of a display of the software on the graphical interface 14 using a song from memory may be presented in FIG. 19. In that there is no need for microphone sensitivity as there is no microphone used, that area on the graphical interface 14 may be replaced with an audio play icon 206. The audio play icon 206 may include a play button 208, a fast forward button 210, a back to start button 212, a repeat song button 214 and an audio selection button 216. The audio selection button 216 may provide access to the audio files stored on the electronic device 12 and be displayed for the user to select. The play button 208 may be used to start the song playing, the fast forward button 210 may advance the song along the track, the back to start button 212 may result in starting the song over and the repeat song button 214 may direct the software to run that song on a continuously repeating loop.

To set a color in a single color mode, as determined by selecting the single color option icon 192, the plus icon 218 may be selected. That may direct the software to change the detail on the graphical interface 14 to that similar to that shown in FIG. 21. Here the graphical interface 14 of the electronic device 12 may show the partial circle area 64, which may display color options. The first zone icon 60 may be positioned in a specific color in the partial circle area 64. The second zone icon 62 may be shown as it may appear if the second zone icon is being dragged to a new location within the partial circle area 64 to assign a new color to that zone. When a new single color is assigned to zone two by positioning of the second zone icon 62, the display on the graphical interface 14 may be changed back to that as shown in FIG. 20 by selecting the close button 220.

If the user selects the multi color option icon 194, to set a color combination the user may select the plus icon 194, which may direct the graphical interface 14 of the electronic device 12 to enable the user to choose a color theme, as may be presented in FIG. 22. A variety of color themes 222 may be displayed each with a title block 138 and a color display sequence 224. Each color theme 222 may be comprised of one or more individual colors designated by individual color blocks 226. When a color theme 222 is selected, that selected theme icon 228 may be displayed as larger compared to the rest of the color themes 222, thus alerting the user as to their selection that will be used. To return to the graphics as may be shown in FIG. 20, the user may select the close icon 230 as shown in FIG. 22.

To create a new color theme 222, the new icon 232 may be selected. This may cause the software to display on the graphical interface 14 of the electronic device 12 a color selection option 234 as shown in FIG. 23. A color may be chosen by selecting and moving a color icon 150 to a position in the color area 152. The color identified by the color icon 150 may be displayed in the current color box 154 below the color area 152. To add the color highlighted by the color icon 150, and shown in the current color box 154, the user may select the plus box 156. That color may then be added to the color boxes 158 in which they are added. If a color is desired to be removed, the user may touch the color box 158 displaying that color, at which time that color box may be displayed as the new current color box 154. The delete color icon 160 may be selected and that color box may be removed. When a theme is completed, the save icon 162 may be pressed. The sensitivity of the brightness of the color output of the lighting arrays 28 may be modified by use of the brightness adjustment 236. The farther the adjustment slider 238 is moved to the right, the greater the sensitivity may become.

Many people will park their vehicle in a crowded parking lot, walk away and then forget where their vehicle is located. This may be especially true when in an unfamiliar place, such as when traveling. The lighting control system of the present invention has a solution for just such an incident. As previously noted, the controller 16 which may be located on the vehicle, may receive the wireless communication 18 from the electronic device 12 in the form of short wavelength, ultra-high-frequency radio waves. Though technology is constantly changing, currently the range of such a system is approximately ten meters. In order for the controller 16 to establish a GPS location on its own, the controller must include a GPS beacon. In that most electronic devices, such as smart-phones, already have a GPS beacon, it may seem redundant and add unnecessary cost to put a second beacon in each controller 16 when there may be a beacon a few feet away in the electronic device 12 the user is using to interface with the lighting control system. Because the range of the wireless communication 18 system is limited to a few feet, the software may mark the GPS coordinate at the moment the wireless signal is lost between the electronic device 12 and the controller 16. This GPS location data may be several feet away from the controller. When the location icon 58 is pressed, the software may generate a map 240 and display it on the graphical interface 14 of the electronic device 12. A location pin 242 may be displayed at the GPS location where the wireless communication signal 18 was lost.

If the wireless communication signal 18 has a range of ten meters, in a crowded parking lot there could be dozens of vehicles in a circle with a twenty meter diameter. When the user goes to the location pin 242 is located on the map 240, the wireless communication 18 may be re-established between the electronic device 12 and the controller 16 located on the vehicle. Confirmation of the wireless communication may be displayed on the graphical interface 14 by a connection tag 244 near the location pin 242 on the map 240. An example of this is illustrated in FIG. 25. At this point, a light icon 246 may be presented on the graphical interface 14. The user may select the light icon 246, which may then turn on the lighting arrays 28 of any active zones as set in the setup page as illustrated in FIG. 4. With the lighting arrays 28 illuminated, the vehicle may easily stand out as being distinguished from the surrounding vehicles.

Figure 27:
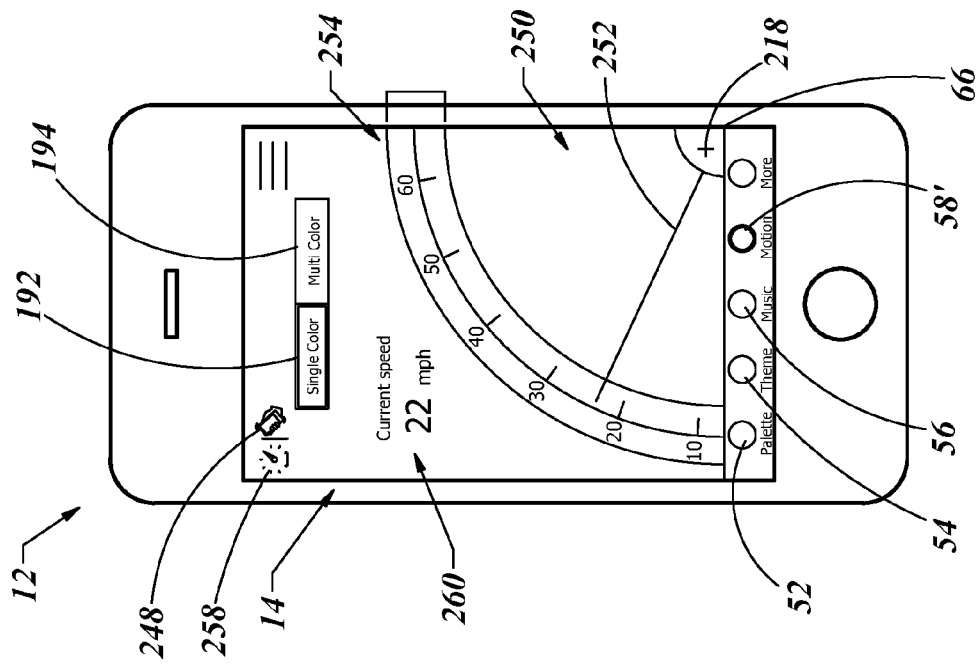
FIG. 27 is a plan view of the electronic device of FIG. 26 with a modified bottom menu, providing a graphic interface with the motion function on the electronic device, set in the current speed mode.
Figure 26:
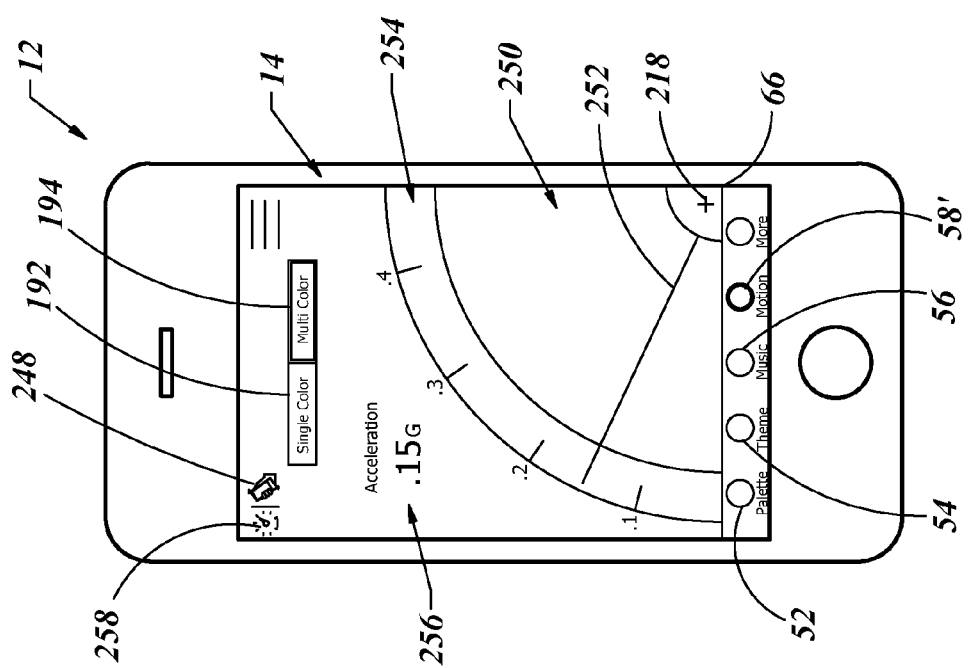
FIG. 26 is a plan view of the electronic device of FIG. 1 with a modified bottom menu, providing a graphic interface with the motion function on the electronic device, set in the acceleration mode.

An alternative to the location icon 58 may be the motion icon 58'. In that the location of any object may be determined by its previous motion, either of these icon names may be used. As is shown in FIG. 26 and FIG. 27, the motion icon 58' is used as these figures illustrate an example of the use of motion data. Many electronic devices 12, such as smart-phones, include a type of accelerometer. This may be a mass suspended by and elastic element in both directions of the x, y and z Cartesian coordinate system set to the reference of the frame of the electronic device 12. In other words, it may be a mass held by six springs, each pair of springs positioned ninety degrees away from each other pair of springs. If the user rotates the electronic device, gravity pulls on the suspended mass and creates more spring tension in some springs relative to other springs. The resultant force vector will always point toward the center of the earth if the electronic device 12 is not moving or moving at a constant velocity in any direction. This information allows the electronic device 12 to know which way is up and rotate the orientation of the display on the graphical interface 14 accordingly. As noted, this system already exists on many electronic devices 12. The software of the lighting control system may use that resultant vector data to determine the movement of the electronic device by calculating acceleration. The lighting control system of the present invention may then use that data to generate an interactive light output by way of the lighting arrays 28.

An acceleration icon 248 may be provided on the graphical interface 14 of the electronic device 12. With reference to FIG. 26, a quarter circle analog dial 250 may be provided with a geographical center 66 positioned near the lower portion of the graphical interface 14. This may be done for the reasons as previously noted as it may facilitate ease of use with a single hand of the user. A needle indicator 252 may be provided to graphically identify the current acceleration of the electronic device 12. An adjustable scale 254 may be provided such that the user may touch the adjustable scale 254 and drag that touched area toward a minimum scale value to increase a maximum scale value and inversely to drag that touched area toward a maximum scale value to decrease the maximum scale value displayed on the graphical interface 14. A digital acceleration 256 may also be provided.

The data displayed on the graphical interface 14 may be mapped to a color and brightness output of light by way of the lighting arrays 28. A single color option icon 192 may be selected to provide a varying brightness of the lighting arrays 28 with regard to the current acceleration data. The greater the acceleration value, the brighter the single light output at the lighting arrays 28 may be. If the multi color option icon 194 is selected, the variation in acceleration data may be mapped to different color output by way of the lighting arrays 28.

A similar system may be provided with respect to current velocity or speed of movement. A speed icon 258 may be provided on the graphical interface 14. Selection of the speed icon 258 may allow the location data from the GPS to calculate the difference in distance between a previous location and a current location and then divide that distance by the time it took to travel that distance. Using short distances, the resulting product may be the speed of movement. An example of how this may be displayed on the graphical interface 14 is illustrated in FIG. 27. Similarly to the acceleration data, the speed may be displayed on the graphical interface 14 by a quarter circle analog dial 250. This may be provided with a geographical center 66 positioned near the lower portion of the graphical interface 14. A needle indicator 252 may be provided to graphically identify the current speed of the electronic device 12. An adjustable scale 254 may be provided such that the user may touch the adjustable scale 254 and drag that touched area toward a minimum scale value to increase a maximum scale value and inversely to drag that touched area toward a maximum scale value to decrease the maximum scale value displayed on the graphical interface 14. A digital speed 260 may also be provided.

The speed data may also be mapped to the lighting arrays 28 such that the single color option icon 192 may be selected to provide a varying brightness of the lighting arrays 28 with regard to the current speed data. The greater the speed value, the brighter the single light output at the lighting arrays 28 may be. If the multi color option icon 194 is selected, the variation in speed data may be mapped to different color output by way of the lighting arrays 28.

The foregoing detailed description of the present invention is provided for purposes of illustration, and it is not intended to be exhaustive or to limit the invention to the particular embodiment shown. The embodiments may provide different capabilities and benefits, depending on the configuration used to implement key features of the invention.

What is claimed is:

1. A lighting control system of the type including an electronic device with a processor, memory, wireless communication capability and a user interface; a controller with a receiver to receive wireless communication from the electronic device and an output terminal; at least one lighting array in electrical communication with the output terminal of the controller; a power supply in electrical communication with the controller thereby providing electrical power to the controller and the lighting array; and software on the electrical device, the software providing a graphical interface with a user to actuate the controller to provide an electrical output to the lighting array, the software including setting a color palette using the graphical interface and the steps of:
    setting a color by manipulating an icon about a partial circle area with a center point of the circle area located near a corner of the graphical interface; and
    altering the color hue by movement of the icon in one radial dimension and moving the same icon in an orthogonal radial dimension to alter the saturation of that color.

2. The lighting control system according to claim 1, further comprising the step of setting a brightness value of the color by moving an icon on a sliding scale on the graphical interface, the sliding scale having a similar center point as the partial circle.

3. The lighting control system according to claim 1, wherein the center point of the partial circle is located near the lower right corner of the graphical interface of the electronic device, whereby a user may grasp the electronic device in their right hand and interact with the graphical interface of the electronic device using the right thumb of the user.

4. The lighting control system according to claim 1, further including the steps of:
    providing a screen flip function; and
    activating the screen flip function, whereby in a first setting the center point of the circle area is located near the bottom right corner of the graphical interface and in a second setting the center point of the circle area is located near the bottom left corner of the graphical interface.

5. The lighting control system according to claim 1, further comprising a pattern selection option on the graphical interface of the electronic device.

6. The lighting control system according to claim 5, wherein the pattern selection is a pattern selected from the group consisting of a solid pattern, a slow fade pattern and a strobe pattern.

7. The lighting control system according to claim 1, further comprising more than one output terminal, each output terminal and any lighting array in electrical communication with that output terminal being designated by a separate zone with respect to a different output terminal.

8. The lighting control system according to claim 7, wherein each zone may be grouped together with another zone to form a group, thereby any action taken to affect the group will affect both zones.

9. The lighting control system according to claim 8, wherein a zone may be grouped to another zone by dragging the icon of one zone over to and stopping over an icon of another zone.

10. The lighting control system according to claim 1, further comprising a color selection icon on the graphical interface, the use of the graphical interface including the steps of:
    activating the camera function of the electronic device;
    creating a source image and saving it within the memory of the electronic device;
    color mapping by selecting a color within the memory of the electronic device with similar color hue and saturation properties to the finite number of pixels of the source image.

11. The lighting control system according to claim 10, further comprising the step of enhancing the color of the source image by use of a color purifying algorithm used to maximize the level of saturation of the color, prior to selecting a mapped color from the memory of the electronic device.

12. The lighting control system according to claim 1, the controller further comprising a sensor wire receiving a voltage input to the controller from a source outside of the lighting control system, wherein upon receiving the voltage input by way of the sensor wire, the controller provides and electrical output to the lighting array.

13. The lighting control system according to claim 1, further including an auto shutdown switch that will signal the controller to turn off the lighting array after a set amount of time after the controller looses the wireless communication with the electronic device.

14. The lighting control system according to claim 1, further including a white light setting, wherein a white color temperature range is selected for a zone.

15. The lighting control system according to claim 1, further including an add to favorites step, whereby any color currently being used is added to a favorites palette that may be later retrieved by the user by actuation of a single button.

\* \* \* \* \*